US012406696B2

(12) United States Patent
Nault et al.

(10) Patent No.: US 12,406,696 B2
(45) Date of Patent: Sep. 2, 2025

(54) PHOTOPOLYMER COMPOSITIONS FOR THERMOSTABLE PHOTOPOLYMERS IN THE VISIBLE SPECTRAL RANGE

(71) Applicant: Covestro Deutschland AG, Leverkusen (DE)

(72) Inventors: Lena Nault, Cologne (DE); Thomas Roelle, Leverkusen (DE); Christel Manecke, Hürth (DE); Richard Meisenheimer, Cologne (DE); Friedrich-Karl Bruder, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/839,994

(22) PCT Filed: Feb. 15, 2023

(86) PCT No.: PCT/EP2023/053806
§ 371 (c)(1),
(2) Date: Aug. 20, 2024

(87) PCT Pub. No.: WO2023/156484
PCT Pub. Date: Aug. 24, 2023

(65) Prior Publication Data
US 2025/0182787 A1 Jun. 5, 2025

(30) Foreign Application Priority Data

Feb. 21, 2022 (EP) ...................................... 22157769

(51) Int. Cl.
*B32B 3/02* (2006.01)
*G11B 7/24044* (2013.01)
*G11B 7/245* (2006.01)

(52) U.S. Cl.
CPC ............... *G11B 7/245* (2013.01); *B32B 3/02* (2013.01); *G11B 7/24044* (2013.01)

(58) Field of Classification Search
CPC ............... G11B 7/245; G11B 7/24044; G03H 2260/00; G03H 2260/12
See application file for complete search history.

(56) References Cited

U.S. PATENT DOCUMENTS

| 10,001,703 B2 | 6/2018 | Berneth et al. |
| 2013/0224634 A1 | 8/2013 | Berneth et al. |
| 2016/0054704 A1 | 2/2016 | Berneth et al. |

FOREIGN PATENT DOCUMENTS

| EP | 0223587 A1 | 5/1987 |
| EP | 3058423 B1 | 4/2018 |
| EP | 2638544 B1 | 12/2018 |
| JP | 2000267273 A | 9/2000 |
| WO | 2008125229 A1 | 10/2008 |

(Continued)

*Primary Examiner* — Elizabeth E Mulvaney
(74) *Attorney, Agent, or Firm* — The Webb Law Firm

(57) ABSTRACT

Photopolymer compositions include a) matrix polymers, b) writing monomers, c) at least one photoinitiator system, d) optionally at least one non-photopolymerisable component, e) optionally catalysts, radical stabilisers, solvents, additives and other auxiliary and/or additional materials. The at least one photoinitiator system c) consists of at least one colouring agent and at least one coinitiator. At least one of the colouring agents has a structure according to formula (II), and the at least one coinitiator has a calculated oxidation potential (E); determined according to the formula (1).

17 Claims, 1 Drawing Sheet

(56) References Cited

FOREIGN PATENT DOCUMENTS

| | | |
|---|---|---|
| WO | 2012062655 A2 | 5/2012 |
| WO | 2015055576 A1 | 4/2015 |
| WO | 2015091427 A1 | 6/2015 |
| WO | 2018087064 A1 | 5/2018 |
| WO | 2018099698 A1 | 6/2018 |

PHOTOPOLYMER COMPOSITIONS FOR THERMOSTABLE PHOTOPOLYMERS IN THE VISIBLE SPECTRAL RANGE

CROSS-REFERENCE TO RELATED APPLICATIONS

This application is the United States national phase of International Patent Application No. PCT/EP2023/053806 filed Feb. 15, 2023, and claims priority to European Patent Application No. 22157769.5 filed Feb. 21, 2022, the disclosures of which are hereby incorporated by reference in their entireties.

BACKGROUND

Technical Field

The invention relates to photopolymer compositions using selected coinitiators, in particular triarylalkylborate salts as coinitiators having a selected oxidation potential, and also to holographic media and holograms produced therefrom, the invention relates additionally to a method for producing the specific coinitiators and also to the coinitiators obtainable by this method, additionally to a method for producing a holographic medium using the specific photopolymer composition including the specific coinitiators, and to a holographic medium obtainable using the photopolymer composition according to the invention. Furthermore, the invention relates to a layer structure comprising a holographic medium according to the invention and likewise specific triarylalkylborate salts suitable as coinitiators. Additionally presented is a method for calculating the oxidation potential against the saturated calomel electrode in acetonitrile of the specific coinitiators.

Description of Related Art

Photopolymer compositions containing general forms of triarylalkylborate salts are known in the prior art. For example, in WO 2008/125229 a photopolymer composition and a photopolymer obtainable therefrom are thus described, comprising polyurethane matrix polymers, one or more acrylate-based writing monomers and photoinitiators containing a coinitiator and a dye. In the uses of photopolymers, the refractive index modulation Δn generated by holographic exposure plays the decisive role. In holographic exposure, the interference field of signal light beam and reference light beam (that of two plane waves in the simplest case) is mapped into a refractive index grating by the local photopolymerization of writing monomers such as, for example, high-refractive-index acrylates at loci of high intensity in the interference field. The refractive index grating in the photopolymer (the hologram) contains all the information of the signal light beam. By illuminating the hologram with the reference light beam only, the signal can then be reconstructed again. The strength of the signal thus reconstructed in relation to the strength of the irradiated reference light is called diffraction efficiency, hereinafter DE.

In the simplest case of a hologram resulting from the superposition of two plane waves, the DE is the ratio of the intensity of the light diffracted on reconstruction to the sum total of the intensities of diffracted light and nondiffracted light. The higher the DE, the greater the efficiency of a hologram with regard to the amount of reference light needed to visualize the signal with a defined brightness.

In order that a very high Δn and a very high DE may be realized for holograms, the matrix polymers and the writing monomers of a photopolymer composition should in principle be chosen such that there is a very large difference in their refractive indices. One possible way to realize this is to use matrix polymers having a very low refractive index and writing monomers having a very high refractive index. Suitable matrix polymers of low refractive index are, for example, polyurethanes obtainable by reaction of a polyol component with a polyisocyanate component.

In addition to high DE and Δn values, however, it is also of great importance for holographic media made of photopolymer compositions that the matrix polymers in the finished medium are highly crosslinked. When the degree of crosslinking is too low, the medium will lack adequate stability. This can cause the quality of holograms written into the media to be significantly reduced and to change over time, which is undesirable. In the worst case, the holograms may even be subsequently destroyed.

Additionally, it is greatly important particularly for the large-scale use of holographic media from photopolymer compositions that the photopolymer films containing the photopolymer composition have a large processing window and can be exposed without loss of index modulation. Particularly the choice of a suitable photoinitiator here is of decisive importance for the properties of the photopolymer.

Well-suited photoinitiators for photopolymer films of the type mentioned at the outset may consist of type II photoinitiators. In these type II photoinitiators, triarylalkylborate salts can be combined as coinitiators together with suitable sensitizers, such as cationic, anionic or neutral dyes, for example, as a photoinitiating system (PIS), so that a radical photopolymerization of suitable monomers can be triggered by UV, visible or near infrared light. The production of such PIS is widely described in the prior art and selected tetraalkylammonium triarylalkylborates as coinitiators and dyes are commercially available. Furthermore, such PIS have already been used in photopolymers and holographic media and their advantages have been described. For example, EP 2638544 describes cationic dyes, such as the dye of formula (I), for example

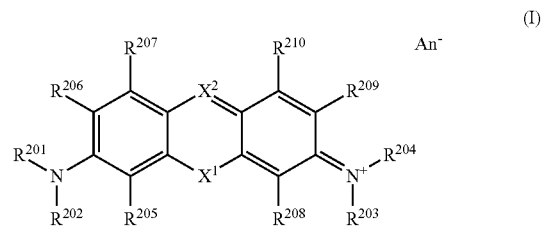

which together with the tris(3-chloro-4-methylphenyl)hexylborate anion can be utilized as a PIS for photocurable materials. Furthermore, a wide selection of triarylalkylborate salts suitable for photopolymers in combination with dyes of the formula (I) are described in EP 3058423. The selection ranges from anions having electron-rich aromatics, such as the tris(4-tert-butylphenyl)hexylborate anion, to anions having very electron-deficient aromatics, such as the tris(4-trifluoromethylphenyl)hexylborate anion. In all these PIS, such as those described in EP 3058423, for example, dye-coinitiator combinations and photopolymer compositions containing a dye and triarylalkylborate salts, however, no attention has been paid to thermal stability of the formulation in the unexposed state. In fact, many of the photopolymer compositions disclosed in EP 3058423 do not have sufficient thermal stability in the unexposed state. This means that at certain thermal load, such as 30 min storage at 140° C., which may be necessary for the generation of holographically optical products, an unwanted side reaction occurs in the photopolymer film, which significantly reduces or even completely prevents the realization of the photoreaction that ensues during exposure, and thus significantly reduces the quality of the holograms to be written in or makes the creation of holograms impossible. As a result, existing photopolymer films cannot be thermally treated to the necessary extent before exposure. However, this is detrimental to certain applications that require handling of the unexposed photopolymer film at elevated temperature.

SUMMARY

Therefore, it was an object of the invention to provide photopolymer compositions that allow the handling of unexposed photopolymer films at increased thermal loading and fulfill as many as possible, or better still all, of the above-mentioned requirements. Further, an object was to provide photopolymer compositions that increase the thermal stability of photopolymer films in the unexposed state. Preferably, other properties such as bleachability or sensitivity during the exposure process should not be adversely affected here. This technical problem has been solved by the subject matter of claim 1 and its dependent claims.

A first subject of the invention is a photopolymer composition comprising:
a) matrix polymers,
b) writing monomers,
c) at least one photoinitiator system,
d) optionally, at least one non-photopolymerizable component,
e) optionally, catalysts, radical stabilizers, solvents, additives and other auxiliaries and/or adjuvants,
wherein the at least one photoinitiator system c) consists of at least one dye and at least one coinitiator, where at least one of the dyes has a structure according to formula (I)

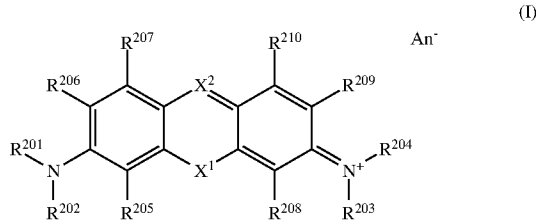

in which
$X^1$ stands for O, S, N—$R^{211}$ or $CR^{211a}R^{211b}$, preferably for O, S or $CR^{211a}R^{211b}$, very particularly preferably for O or S,
$R^{211}$ stands for hydrogen, $C_1$ to $C_{16}$ alkyl, $C_4$ to $C_7$ cycloalkyl, $C_7$ to $C_{16}$ aralkyl, $C_6$ to $C_{10}$ aryl or a heterocyclic radical,
$R^{211a}$ and $R^{211b}$ are identical and stand for methyl, ethyl or together stand for a —$CH_2$—$CH_2$—$CH_2$— or —$CH_2$—$CH_2$—$CH_2$—$CH_2$— bridge,
$X^2$ stands for N or C—$R^{212}$,
$R^{212}$ stands for hydrogen, cyano, $C_1$ to $C_4$ alkyl, $C_4$ to $C_7$ cycloalkyl, a $C_6$ to $C_{10}$ aryl which is optionally substituted by $C_1$ to $C_4$ alkoxycarbonyl or $NR^{213}R^{214}$, or a heterocyclic radical, $R^{201}$ to $R^{204}$, $R^{213}$ and $R^{214}$ stand independently of each other for hydrogen, $C_1$ to $C_{16}$ alkyl, $C_4$ to $C_7$ cycloalkyl, $C_7$ to $C_{16}$ aralkyl, $C_6$ to $C_{10}$ aryl or a heterocyclic radical or
$NR^{201}R^{202}$, $NR^{203}R^{204}$ and $NR^{213}R^{214}$ stand independently of each other for a five- or six-membered saturated ring attached via N, which may additionally contain an N or O and/or may be substituted by nonionic radicals, or
$R^{201}$ to $R^{204}$, $R^{213}$ and $R^{214}$ independently of each other and with a C atom of the benzene ring adjacent to the N atom form a two- or three-membered bridge, which may contain an O or N and/or may be substituted by nonionic radicals,
$R^{205}$, $R^{206}$, $R^{207}$, $R^{208}$, $R^{209}$ and $R^{210}$ stand independently of each other for hydrogen, halogen or $C_1$ to $C_4$ alkyl,
An stands for an anion selected from halide, cyanide, nitrate, azide, perchlorate, hexafluorophosphate, hexafluoroantimonate, arbitrarily substituted phosphate, arbitrarily substituted phosphonate, arbitrarily substituted sulfonimide, for example bis(trifluoromethyl)sulfonimide, arbitrarily substituted organic borate, for example tetrafluoroborate, tetraarylborate, triarylalkylborate or cyanotriarylborate, arbitrarily substituted alkyl or alkenyl sulfate, arbitrarily substituted mono- or di-sulfonate, for example methyl sulfonate, p-toluenesulfonate, trifluoromethylsulfonate, or sulfosuccinate, or an arbitrarily substituted organic mono- or di-carboxylate, and the at least one coinitiator has a calculated oxidation potential $E_{ox}^{calculated}$, determined according to the formula (1) below by the quantum mechanical calculation of the Gibbs energies at 298 K of the ground state and the oxidized state of the coinitiator, in particular of the triarylalkylborate after geometry optimization, consisting of conformer energy minimization by means of the AM1 force field followed by ab initio conformer energy calculation based on the previously determined molecular geometry coordinates, in the solvent acetonitrile under solvent field correction according to the PCM method, in the range from 1.16 V to 1.37 V against the saturated calomel electrode (SCE) in acetonitrile $$E_{ox}^{calculated} = -\frac{(G_{298} - G_{298}(\text{oxidized}))}{23.061 \frac{\text{kcal}}{\text{mol} \cdot \text{V}}} + 4.14 \text{ V}. \quad (1)$$

DETAILED DESCRIPTION

Figure 1:
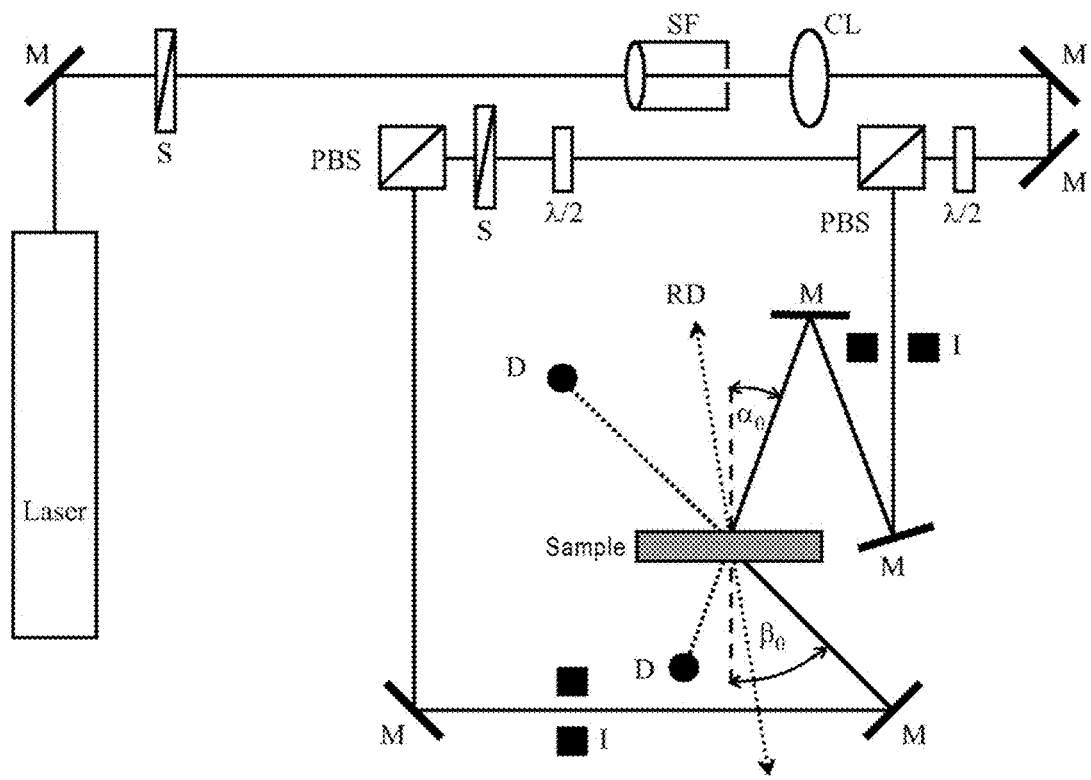
FIG. 1 shows the holographic experimental setup with which the diffraction efficiency (DE) of the media was measured.

The matrix polymer a) can be any matrix polymer a) which the person skilled in the art would select for the photopolymer composition according to the invention. Suitable matrix polymers a) for the photopolymer composition can be in particular crosslinked and, particularly preferably, three-dimensionally crosslinked.

It is preferred that the matrix polymers a) are polyurethanes, where the polyurethanes may be obtainable in particular by reacting at least one polyisocyanate component aI) with at least one isocyanate-reactive component aII).

The polyisocyanate component aI) preferably comprises at least one organic compound having at least two NCO groups. These organic compounds may in particular be monomeric di- and triisocyanates, polyisocyanates and/or NCO-functional prepolymers. The polyisocyanate component aI) may also contain or consist of mixtures of monomeric di- and triisocyanates, polyisocyanates and/or NCO-functional prepolymers.

Employable monomeric di- and triisocyanates include all of the compounds or mixtures thereof that are well known per se to the person skilled in the art. These compounds may have aromatic, araliphatic, aliphatic or cycloaliphatic structures. In minor amounts the monomeric di- and triisocyanates may also comprise monoisocyanates, i.e. organic compounds having one NCO group.

Examples of suitable monomeric di- and triisocyanates are butane 1,4-diisocyanate, pentane 1,5-diisocyanate, hexane 1,6-diisocyanate (hexamethylene diisocyanate, HDI), 2,2,4-trimethylhexamethylene diisocyanate and/or 2,4,4-trimethylhexamethylene diisocyanate (TMDI), isophorone diisocyanate (IPDI), 1,8-diisocyanato-4-(isocyanatomethyl)octane, bis(4,4'-isocyanatocyclohexyl)methane and/or bis(2',4-isocyanatocyclohexyl)methane and/or mixtures thereof having any isomer content, cyclohexane 1,4-diisocyanate, the isomeric bis(isocyanatomethyl)cyclohexanes, 2,4- and/or 2,6-diisocyanato-1-methylcyclohexane (hexahydrotolylene 2,4- and/or 2,6-diisocyanate, $H_6$-TDI), phenylene 1,4-diisocyanate, tolylene 2,4- and/or 2,6-diisocyanate (TDI), naphthylene 1,5-diisocyanate (NDI), diphenylmethane 2,4'- and/or 4,4'-diisocyanate (MDI), 1,3-bis(isocyanatomethyl)benzene (XDI) and/or the analogous 1,4 isomers or any desired mixtures of the aforementioned compounds.

Suitable polyisocyanates are compounds which have urethane, urea, carbodiimide, acylurea, amide, isocyanurate, allophanate, biuret, oxadiazinetrione, uretdione and/or iminooxadiazinedione structures and are obtainable from the aforementioned di- or triisocyanates. More preferably, the polyisocyanates are oligomerized aliphatic and/or cycloaliphatic di- or triisocyanates, and it is especially possible to use the above aliphatic and/or cycloaliphatic di- or triisocyanates.

Very particular preference is given to polyisocyanates having isocyanurate, uretdione and/or iminooxadiazinedione structures and to biurets based on HDI or mixtures thereof.

Suitable prepolymers contain urethane and/or urea groups, and optionally further structures formed through modification of NCO groups as recited above. Prepolymers of this kind are obtainable, for example, by reaction of the abovementioned monomeric di- and triisocyanates and/or polyisocyanates aII) with isocyanate-reactive compounds aII1).

Alcohols, amino or mercapto compounds, preferably alcohols, can be used as isocyanate-reactive compounds aII1). These may in particular be polyols. Very preferably, the isocyanate-reactive compound aII1) used may be polyester polyols, polyether polyols, polycarbonate polyols, poly (meth)acrylate polyols and/or polyurethane polyols.

Suitable polyester polyols are, for example, linear polyester diols or branched polyester polyols which can be obtained in a known manner by reacting aliphatic, cycloaliphatic or aromatic di- or polycarboxylic acids or the anhydrides thereof with polyhydric alcohols of OH functionality ≥2. Examples of suitable di- or polycarboxylic acids are polybasic carboxylic acids such as succinic acid, adipic acid, suberic acid, sebacic acid, decanedicarboxylic acid, phthalic acid, terephthalic acid, isophthalic acid, tetrahydrophthalic acid or trimellitic acid, and acid anhydrides such as phthalic anhydride, trimellitic anhydride or succinic anhydride, or any desired mixtures thereof. The polyester polyols may also be based on natural raw materials such as castor oil. It is likewise possible for the polyester polyols to be based on homo- or copolymers of lactones which are preferably obtainable by addition of lactones or lactone mixtures such as butyrolactone, ε-caprolactone and/or methyl-ε-caprolactone onto hydroxy-functional compounds such as polyhydric alcohols of OH functionality ≥2, for example of the kind recited below.

Examples of suitable alcohols are all polyhydric alcohols such as, for example, the $C_2$-$C_{12}$ diols, the isomeric cyclohexanediols, glycerol or their arbitrary mixtures with each other.

Suitable polycarbonate polyols are accessible in a manner known per se by reaction of organic carbonates or phosgene with diols or diol mixtures.

Suitable organic carbonates are dimethyl, diethyl and diphenyl carbonates.

Suitable diols or mixtures comprise the polyhydric alcohols of OH functionality ≥2 mentioned per se in the context of the polyester segments, preferably butane-1,4-diol, hexane-1,6-diol and/or 3-methylpentanediol. Polyester polyols can also be converted into polycarbonate polyols.

Suitable polyether polyols are polyaddition products, optionally of blockwise construction, of cyclic ethers onto OH— or NH— functional starter molecules.

Suitable cyclic ethers are, for example, styrene oxides, ethylene oxide, propylene oxide, tetrahydrofuran, butylene oxide, epichlorohydrin and arbitrary mixtures thereof.

Starters used may be the polyhydric alcohols of OH functionality ≥2 mentioned per se in the context of the polyester polyols, and also primary or secondary amines and amino alcohols.

Preferred polyether polyols are those of the aforementioned type based exclusively on propylene oxide, or random or block copolymers based on propylene oxide with further 1-alkylene oxides. Particularly preferred are propylene oxide homopolymers and also statistical or block copolymers which have oxyethylene, oxypropylene and/or oxybutylene units, where the proportion of the oxypropylene units based on the total amount of all oxyethylene, oxypropylene and oxybutylene units is at least 20 wt %, preferably at least 45 wt %. Oxypropylene and oxybutylene here comprise all respective linear and branched $C_3$ and $C_4$ isomers.

In addition, suitable constituents of the polyol component aII1), as polyfunctional isocyanate-reactive compounds, are also aliphatic, araliphatic or cycloaliphatic di-, tri- or polyfunctional alcohols of low molecular weight, i.e. having molecular weights ≤500 g/mol, and having short chains, i.e. containing 2 to 20 carbon atoms.

These may be, for example, in addition to the abovementioned compounds, neopentyl glycol, 2-ethyl-2-butylpropanediol, trimethylpentanediol, positionally isomeric diethyloctanediols, cyclohexanediol, cyclohexane-1,4-dimethanol, hexane-1,6-diol, cyclohexane-1,2-and-1,4-diol, hydrogenated bisphenol A, 2,2-bis(4-hydroxycyclohexyl) propane or 2,2-dimethyl-3-hydroxypropionic acid, 2,2-dimethyl-3-hydroxypropyl ester. Examples of suitable triols are trimethylolethane, trimethylolpropane or glycerol. Suitable higher-functionality alcohols are di(trimethylolpropane), pentaerythritol, dipentaerythritol or sorbitol.

It is particularly preferred for the polyol component to be a difunctional polyether, polyester or a polyether-polyester block copolyester or a polyether-polyester block copolymer with primary OH functions.

It is likewise possible to use amines as isocyanate-reactive compounds aII1). Examples of suitable amines are ethylenediamine, propylenediamine, diaminocyclohexane, 4,4'-dicyclohexylmethanediamine, isophoronediamine (IPDA), difunctional polyamines, for example the Jeffamines®, amine-terminated polymers, in particular having number-average molar masses ≤10 000 g/mol. Mixtures of the aforementioned amines may also be used.

It is likewise possible to use amino alcohols as isocyanate-reactive compounds aII1). Examples of suitable amino alcohols are the isomeric aminoethanols, the isomeric aminopropanols, the isomeric aminobutanols and the isomeric aminohexanols or arbitrary mixtures thereof.

All the aforementioned isocyanate-reactive compounds aII1) can be mixed with one another as desired.

It is also preferable if the isocyanate-reactive compounds aII1) have a number-average molar mass of ≥200 and ≤10 000 g/mol, more preferably ≥500 and ≤8000 g/mol and very particularly preferably ≥800 and ≤5000 g/mol. The OH functionality of the polyols is preferably 1.5 to 6.0, particularly preferably 1.8 to 4.0.

The prepolymers of the polyisocyanate component aI) may in particular have a residual content of free monomeric di- and triisocyanates <1 wt %, particularly preferably <0.5 wt % and very preferably <0.3 wt %.

It may also be possible for the polyisocyanate component aI) to contain, in full or in part, an organic compound wherein the NCO groups have been fully or partly reacted with blocking agents known from coating technology. Examples of blocking agents are alcohols, lactams, oximes, malonic esters, pyrazoles and amines, for example butanone oxime, diisopropylamine, diethyl malonate, ethyl acetoacetate, 3,5-dimethylpyrazole, ε-caprolactam or mixtures thereof.

It is particularly preferred if the polyisocyanate component aI) comprises compounds with aliphatically bonded NCO groups, where aliphatically bonded NCO groups are understood to mean those groups that are bonded to a primary C atom. The isocyanate-reactive component aII) preferably comprises at least one organic compound which has on average at least 1.5 and preferably 2 to 3 isocyanate-reactive groups. In the context of the present invention, isocyanate-reactive groups are preferably considered to be hydroxyl, amino or mercapto groups.

The isocyanate-reactive component may in particular comprise compounds having a numerical average of at least 1.5 and preferably 2 to 3 isocyanate-reactive groups.

Suitable polyfunctional, isocyanate-reactive compounds of component aII) are, for example, the compounds aII1) described above.

In another preferred embodiment, it is provided that the substance catalyzing the polyurethane formation comes from the group of tin-based organyls, or is one based on iron(II), iron(III), gallium(III), bismuth(III), vanadium(III), vanadium(IV), terbium(III), tin(II), zinc(II), zirconium(IV) complex with suitable mono- or bidentate ligands.

The writing monomer b) can be any writing monomer that the person skilled in the art would select for the photopolymer composition according to the invention. Preferably, the writing monomer b) comprises or consists of at least one mono- and/or one multifunctional writing monomer. Further preferably, the writing monomer b) may comprise or consist of at least one mono- and/or one multifunctional (meth)acrylate writing monomer. Very preferably, the writing monomer may comprise or consist of at least one mono- and/or one multifunctional urethane (meth)acrylate.

Suitable acrylate writing monomers are especially compounds of the general formula (III)

in which $m \geq 1$ and $m \leq 4$ and $R^5$ is a linear, branched, cyclic or heterocyclic organic moiety which is unsubstituted or else optionally substituted by heteroatoms and/or $R^6$ is hydrogen or a linear, branched, cyclic or heterocyclic organic moiety which is unsubstituted or else optionally substituted by heteroatoms. More preferably, $R^6$ is hydrogen or methyl and/or $R^5$ is a linear, branched, cyclic or heterocyclic organic moiety which is unsubstituted or else optionally substituted by heteroatoms.

Acrylates and methacrylates refer in the present context, respectively, to esters of acrylic acid and methacrylic acid. Examples of preferably usable acrylates and methacrylates are phenyl acrylate, phenyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, bisphenol A diacrylate, bisphenol A dimethacrylate, and their ethoxylated analog compounds or N-carbazolyl acrylates.

Urethane acrylates are understood in the present context to mean compounds having at least one acrylic ester group and at least one urethane bond. Such compounds can be obtained, for example, by reacting a hydroxy-functional acrylate or methacrylate with an isocyanate-functional compound.

Examples of isocyanate-functional compounds which can be used for this purpose are monoisocyanates and also the monomeric diisocyanates, triisocyanates and/or polyisocyanates stated under aI). Examples of suitable monoisocyanates are phenyl isocyanate, the isomeric methylthiophenyl isocyanates. Di-, tri- or polyisocyanates are mentioned above, as are triphenylmethane 4,4',4"-triisocyanate and tris(p-isocyanatophenyl) thiophosphate or derivatives thereof having a urethane, urea, carbodiimide, acylurea, isocyanurate, allophanate, biuret, oxadiazinetrione, uretdione or iminooxadiazinedione structure and mixtures thereof. Aromatic di-, tri- or polyisocyanates are preferred here.

Hydroxy-functional acrylates or methacrylates for the preparation of urethane acrylates are, for example, compounds such as 2-hydroxyethyl (meth)acrylate, polyethylene oxide mono(meth)acrylates, polypropylene oxide mono (meth)acrylates, polyalkylene oxide mono(meth)acrylates, poly(ε-caprolactone) mono(meth)acrylates, such as Tone® M100 (Dow, Schwalbach, DE), 2-hydroxypropyl (meth)acrylate, 4-hydroxybutyl (meth)acrylate, 3-hydroxy-2,2-dimethylpropyl (meth)acrylate, hydroxypropyl (meth)acrylate, acrylic acid 2-hydroxy-3-phenoxypropyl ester, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or technical mixtures thereof. Preference is given to 2-hydroxyethyl acrylate, hydroxypropyl acrylate, 4-hydroxybutyl acrylate and poly(ε-caprolactone) mono (meth)acrylate.

Likewise possible for use are the conventional hydroxyl group-containing epoxy (meth)acrylates with OH contents from 20 to 300 mg KOH/g or hydroxyl group-containing polyurethane (meth)acrylates with OH contents from 20 to 300 mg KOH/g or acrylated polyacrylates with OH contents from 20 to 300 mg KOH/g and also their mixtures with each other and mixtures with hydroxyl group-containing unsaturated polyesters and also mixtures with polyester (meth) acrylates or mixtures of hydroxyl group-containing unsaturated polyesters with polyester (meth)acrylates.

Preferably, urethane acrylates in particular are obtainable from the reaction of tris(p-isocyanatophenyl) thiophosphate and/or m-methylthiophenyl isocyanate with alcohol-functional acrylates such as hydroxyethyl (meth)acrylate, hydroxypropyl (meth)acrylate and/or hydroxybutyl (meth) acrylate or reaction products of 2-isocyanatoethyl acrylate and/or 2-isocyanatoethyl methacrylate and/or 1,1-(bisacryloyloxymethyl)ethyl isocyanate with optionally arbitrarily substituted naphthols.

It is also possible that the writing monomer comprises or consists of further unsaturated compounds such as α,β-unsaturated carboxylic acid derivatives such as, for example, maleates, fumarates, maleimides, acrylamides, additionally vinyl ether, propenyl ether, allyl ether and compounds containing dicyclopentadienyl units, and also olefinically unsaturated compounds such as styrene, α-methylstyrene, vinyltoluene and/or olefins, for example.

The at least one photoinitiator system c) can be any photoinitiator system which the person skilled in the art would select for the photopolymer composition according to the invention. Photoinitiators of component c) are usually compounds activatable by actinic radiation, which can trigger polymerization of the writing monomers. The photoinitiators can be differentiated as unimolecular (type I) and bimolecular (type II) initiators. In addition, they are distinguished in terms of their chemical nature into photoinitiators for radical, anionic, cationic or mixed modes of polymerization.

Type I photoinitiators (Norrish type I) for radical photopolymerization on irradiation form free radicals through unimolecular bond scission. Examples of type I photoinitiators are triazines, oximes, benzoin ethers, benzil ketals, bis-imidazoles, aroylphosphine oxides, sulfonium salts and iodonium salts.

Type II photoinitiators (Norrish type II) for radical polymerization consist of a dye as sensitizer and a coinitiator and undergo a bimolecular reaction when irradiated with light adapted to the dye. First, the dye absorbs a photon and transfers energy from an excited state to the coinitiator. The latter releases the polymerization-initiating radicals through electron or proton transfer or direct hydrogen abstraction.

In the context of this invention, type II photoinitiators are preferably used.

Such photoinitiator systems are described in principle in EP 0 223 587 A and preferably consist of a mixture of one or more dyes.

Suitable dyes of component cI), which together with a compound of formula (II) form a type II photoinitiator, are the cationic dyes described in WO 2012062655 in combination with the anions described therein.

Cationic dyes are preferably understood to be those of the following classes: acridine dyes, xanthene dyes, thioxanthene dyes, phenazine dyes, phenoxazine dyes, phenothiazine dyes, tri(het)arylmethane dyes—in particular diamino- and triamino(het)arylmethane dyes, mono-, di, tri- and pentamethinecyanine dyes, hemicyanine dyes, externally cationic merocyanine dyes, externally cationic neutrocyanine dyes, nullmethine dyes—in particular naphtholactam dyes, streptocyanine dyes. Dyes of this kind are described, for example, in H. Berneth in Ullmann's Encyclopedia of Industrial Chemistry, Azine Dyes, Wiley-VCH Verlag, 2008, H. Berneth in Ullmann's Encyclopedia of Industrial Chemistry, Methine Dyes and Pigments, Wiley-VCH Verlag, 2008, T. Gessner, U. Mayer in Ullmann's Encyclopedia of Industrial Chemistry, Triarylmethane and Diarylmethane Dyes, Wiley-VCH Verlag, 2000.

Particularly preferred are phenazine dyes, phenoxazine dyes, phenothiazine dyes, tri(het)arylmethane dyes—in particular diamino- and triamino(het)arylmethane dyes, mono-, di-, tri- and pentamethinecyanine dyes, hemicyanine dyes, nullmethine dyes—in particular naphtholactam dyes, streptocyanine dyes.

Examples of cationic dyes are Astrazon Orange G, Basic Blue 3, Basic Orange 22, Basic Red 13, Basic Violet 7, Methylene Blue, New Methylene Blue, Azure A, 2,4-diphenyl-6-(4-methoxyphenyl) pyrylium, Safranin O, Astraphloxin, Brilliant Green, Crystal Violet, Ethyl Violet and Thionin.

Preferred anions (An⁻) of the cationic dyes are, in particular, $C_8$- to $C_{25}$-alkanesulfonate, preferably $C_{13}$- to $C_{25}$-alkanesulfonate, $C_3$- to $C_{18}$-perfluoroalkanesulfonate, $C_4$- to $C_{18}$-perfluoroalkanesulfonate which in the alkyl chain carries at least 3 hydrogen atoms, $C_9$- to $C_{25}$-alkanoate, $C_9$- to $C_{25}$-alkenoate, $C_8$- to $C_{25}$-alkylsulfate, preferably $C_{13}$- to $C_{25}$-alkylsulfate, $C_8$- to $C_{25}$-alkenylsulfate, preferably $C_{13}$- to $C_{25}$-alkenylsulfate, $C_3$- to $C_{18}$-perfluoroalkylsulfate, $C_4$- to $C_{18}$-perfluoroalkylsulfate which in the alkyl chain carries at least 3 hydrogen atoms, polyethersulfates based on at least 4 equivalents of ethylene oxide and/or 4 equivalents of propylene oxide, bis-$C_4$- to $C_{25}$-alkyl-, $C_5$- to $C_7$-cycloalkyl-, $C_3$- to $C_8$-alkenyl- or $C_7$- to $C_{11}$-aralkyl-sulfosuccinate, bis-$C_2$- to $C_{10}$-alkyl-sulfosuccinate substituted by at least 8 fluorine atoms, $C_8$- to $C_{25}$-alkyl-sulfoacetates, benzenesulfonate substituted by at least one radical from the group of halogen, $C_4$- to $C_{25}$-alkyl, perfluoro-$C_1$- to $C_8$-alkyl and/or $C_1$- to $C_{12}$-alkoxycarbonyl, naphthalene- or biphenylsulfonate optionally substituted by nitro, cyano, hydroxy, $C_1$- to $C_{25}$-alkyl, $C_1$- to $C_{12}$-alkoxy, amino, $C_1$- to $C_{12}$-alkoxycarbonyl or chlorine, benzene-, naphthalene- or biphenyldisulfonate optionally substituted by nitro, cyano, hydroxy, $C_1$- to $C_{25}$-alkyl, $C_1$- to $C_{12}$-alkoxy, $C_1$- to $C_{12}$-alkoxycarbonyl or chlorine, benzoate substituted by dinitro, $C_6$- to $C_{25}$-alkyl, $C_4$- to $C_{12}$-alkoxycarbonyl, benzoyl, chlorobenzoyl or toluoyl, the anion of naphthalenedicarboxylic acid, diphenyl ether disulfonate, sulfonated or sulfated, optionally at least monounsaturated $C_8$- to $C_{25}$-fatty acid esters of aliphatic $C_1$- to $C_8$-alcohols or glycerol, bis-(sulfo-$C_2$- to $C_6$-alkyl)-$C_3$- to $C_{12}$-alkanedicarboxylic esters, bis-(sulfo-$C_2$- to $C_6$-alkyl)-itaconic esters, (sulfo-$C_2$- to $C_6$-alkyl)-$C_6$- to $C_{18}$-alkanecarboxylic esters, (sulfo-$C_2$- to $C_6$-alkyl)-acrylic or -methacrylic esters, triscatecholphosphate optionally substituted by up to 12 halogen radicals, an anion from the group of tetraphenylborate, cyanotriphenylborate, tetraphenoxyborate, $C_4$- to $C_{12}$-alkyl-triphenylborate, in which the phenyl- or phenoxy radicals may be substituted by halogen, $C_1$- to $C_4$-alkyl and/or $C_1$- to $C_4$-alkoxy, $C_4$- to $C_{12}$-alkyl-trinaphthylborate, tetra-$C_1$- to $C_{20}$-alkoxyborate, 7,8- or 7,9-dicarbanidoundecaborate(1-) or (2-), which are optionally substituted on the B and/or C atoms by one or two $C_1$- to $C_{12}$-alkyl or phenyl groups, dodecahydrodicarbadodecaborate(2-) or B—$C_1$- to $C_{12}$-alkyl-C-phenyl-dodecahydrodicarbadodecaborate(1-), where in the case of polyvalent anions such as naphthalenedisulfonate, $An^-$ stands for one equivalent of this anion, and where the alkane and alkyl groups may be branched and/or may be substituted by halogen, cyano, methoxy, ethoxy, methoxycarbonyl or ethoxycarbonyl.

In the context of this invention, the anions described in WO 2012062655 are preferably used.

It is also preferable if the anion $An^-$ of the dye has an AClogP in the range from 1 to 30, more preferably in the range from 1 to 12 and especially preferably in the range from 1 to 6.5. The AClogP is calculated according to J. Comput. Aid. Mol. Des. 2005, 19, 453; Virtual Computational Chemistry Laboratory, http://www.vcclab.org.

Suitable coinitiators of component cII) for a type II photoinitiator system are borate salts, especially triarylalkylborate salts, which are described in WO 2015/055576. Other coinitiators may be pentacoordinated silicates or tertiary aromatic amines.

The at least one non-photopolymerizable component d) may be any component d) which the person skilled in the art would select for the photopolymer composition according to the invention. It is preferably provided that the photopolymer composition additionally contains urethanes as additives of component d), where the urethanes can be substituted in particular by at least one fluorine atom.

Preferably, the urethanes may have the general formula (XVI)

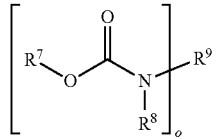

(XVI)

in which o≥1 and o≤8 and $R^7$, $R^8$ and $R^9$ are linear, branched, cyclic or heterocyclic unsubstituted or else optionally heteroatom-substituted organic radicals and/or $R^8$, $R^9$ independently of one another are hydrogen, with preferably at least one of the radicals $R^7$, $R^8$, $R^9$ being substituted by at least one fluorine atom and particularly preferably $R^7$ being an organic radical having at least one fluorine atom. Particularly preferably, $R^9$ is a linear, branched, cyclic or heterocyclic organic radical which is unsubstituted or else optionally substituted by heteroatoms such as fluorine.

In a preferred embodiment of the photopolymer composition, the at least one dye according to the structure of the formula (I) has the following radicals:
$X^1$ stands for O, S or $NR^{211}$, preferably for O or S,
$X^2$ stands for N,
$R^{211}$ stands for hydrogen, methyl, ethyl, propyl, butyl, cyclohexyl, benzyl, phenyl, tolyl, anisyl or chlorophenyl,
$R^{201}$ to $R^{204}$ stand independently of each other for hydrogen, methyl, ethyl, propyl, butyl, chloroethyl, cyanomethyl, cyanoethyl, methoxyethyl, cyclopentyl, cyclohexyl, cyclohexylmethyl, benzyl, phenyl, tolyl, anisyl or chlorophenyl or
$NR^{201}R^{202}$, $NR^{203}R^{204}$ and $NR^{213}R^{214}$ stand independently of each other for pyrrolidino, piperidino, morpholino or N-methylpiperazino, $R^{205}$, $R^{206}$, $R^{207}$, $R^{208}$, $R^{209}$ and $R^{210}$ stand for hydrogen or in each case one of the radicals $R^{205}$, $R^{206}$, $R^{207}$ and/or one of the radicals $R^{208}$, $R^{209}$ and $R^{210}$ stands for methyl or
$R^{201}$; $R^{205}$, $R^{202}$; $R^{206}$, $R^{203}$; $R^{208}$ and $R^{204}$; $R^{209}$ independently of each other form a —$CH_2CH_2$—, —$CH_2CH_2CH_2$— or —$CH_2CH_2$—O— bridge, which can carry up to three methyl groups.

In a preferred embodiment of the photopolymer composition, the at least one dye has a structure of formula (XVII),

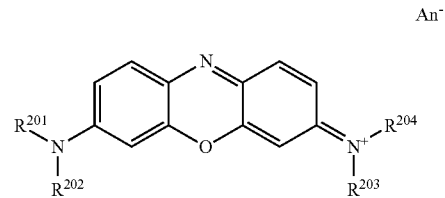

(XVII)

in which $R^{201}$ to $R^{204}$ stand independently of each other for hydrogen, methyl, ethyl, propyl or butyl.

In a preferred embodiment of the photopolymer composition, the at least one dye according to formula (I) or formula (XVII) present has an organically substituted sulfonate as anion ($An^-$).

In a preferred embodiment of the photopolymer composition, the at least one coinitiator is a triarylalkylborate salt.

In a preferred embodiment of the photopolymer composition, the coinitiator contains a triarylalkylborate according to the formula (II), where the triarylalkylborates preferably have a calculated oxidation potential of between 1.16 V vs. SCE and 1.37 V vs. SCE in acetonitrile and

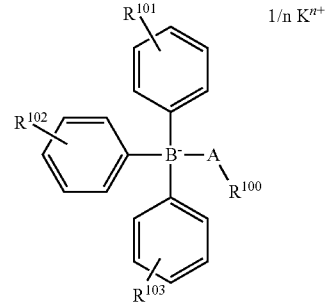

(II)

in which
A stands for methylene or for an arbitrarily substituted methine, which can optionally form an up to 10-membered ring with $R^{100}$,
$R^{100}$ is a $C_1$ to $C_{20}$ alkyl, $C_3$ to $C_{20}$ alkenyl, $C_3$ to $C_{20}$ alkynyl, $C_5$ to $C_7$ cycloalkyl or $C_7$ to $C_{13}$ aralkyl radical, optionally substituted by hydroxyl and/or alkoxy and/or acyloxy and/or halogen,
$R^{101}$, $R^{102}$ and $R^{103}$ each stand for up to five independently selected radicals from $C_1$ to $C_{10}$ alkyl, $C_3$ to $C_5$ alkenyl, $C_3$ to $C_5$ alkynyl, $C_5$ to $C_7$ cycloalkyl or $C_7$ to $C_{13}$ aralkyl radical, halogen, cyano, trifluoromethyl, trichloromethyl, difluoromethyl, dichloromethyl, trifluoromethylthioyl, trichloromethylthioyl, $C_1$ to $C_4$ alkoxy, trifluoromethoxy, trichloromethoxy, $C_1$ to $C_4$ alkylthioyl, thioyl, difluoromethoxy, difluoromethylthioyl, carboxyl, carbonyl, 2-, 3- or 4-pyridyl, or any substituted aryl radicals or hydrogen, the radicals being selected such that the radical-dependent calculated oxidation potential of the triarylalkylborate (II) is in a range between 1.16 V vs. SCE and 1.37 V vs. SCE in acetonitrile, K$^+$ stands for an arbitrarily substituted organocation of valence n based on nitrogen, phosphorus, oxygen, sulfur, and/or iodine and n stands for 1, 2, or 3.

In this embodiment of the photopolymer composition, A is preferably a methylene group.

In a preferred embodiment of the photopolymer composition, for the triarylalkylborate of structure (II), $R^{100}$ stands for a $C_1$ to $C_{20}$ alkyl, $C_3$ to $C_{12}$ alkyl, $C_5$ to $C_7$ cycloalkyl or $C_7$ to $C_{13}$ aralkyl radical and $R^{101}$, $R^{102}$ and $R^{103}$ each stand for one to two radicals selected independently of one another from $C_1$ to $C_4$ alkyl, halogen, cyano, trifluoromethyl, $C_1$ to $C_4$ alkoxy or arbitrarily substituted aryl radicals or hydrogen. Preferably, at least one radical selected from the group $R^{101}$, $R^{102}$ and $R^{103}$ is not hydrogen. Preferably, at least one of the at least in each case two $R^{101}$ radicals, two $R^{102}$ radicals and two $R^{103}$ radicals is arranged in meta position or para position to the B atom, more preferably in para position. Preferably, in the case of two $R^{101}$, $R^{102}$ and $R^{103}$ radicals, the two radicals are each in meta position and para position to the B atom. In this embodiment of the photopolymer composition, A preferably stands for a methylene group.

Furthermore, for the triarylalkylborate of structure (II), $R^{100}$ stands preferably for $C_3$ to $C_5$ alkyl radical, where A is preferably a methylene group and at least one of the radicals $R^{101}$, $R^{102}$ and $R^{103}$ stands for in each case one to two radicals in meta and/or para position, selected independently of one another from $C_1$ to $C_4$ alkyl radicals and halogen substituents, preferably at least $R^{102}$ and/or $R^{103}$ independently of one another stand for selected halogen substituents, where halogen substituents include not only halogen radicals such as Cl radical or F radical but also trihaloalkyl radicals, in particular trihalomethyl radicals and trihaloethyl radicals, in particular trifluoromethyl radicals and trichloromethyl radicals.

In another preferred embodiment of the photopolymer composition, for the triarylalkylborate of structure (II), $R^{100}$ stands for a $C_3$ to $C_{12}$ alkyl radical and $R^{101}$, $R^{102}$, and $R^{103}$ independently of each other stand for one to two radicals in meta- or para-position, selected from the group consisting of $C_1$- to $C_4$ alkyl radicals and halogen substituents, preferably at least $R^{102}$ and/or $R^{103}$ stand for a halogen substituent. In the case of two $R^{101}$, two $R^{102}$ and two $R^{103}$ radicals, the two radicals are preferably in each case in meta position and para position to the B atom. Preferably, at least $R^{102}$ and/or $R^{103}$ is a halogen substituent. Preferably, in this embodiment, A stands for a methylene group.

Furthermore, preferably, for the triarylalkylborate of structure (II), $R^{100}$ stands for $C_3$ to $C_5$ alkyl radical, where A is preferably a methylene group and $R^{101}$, $R^{102}$ and $R^{103}$ each stand for one to two, in meta and/or para position, radicals selected independently of one another from $C_1$ to $C_4$ alkyl radicals and halogen substituents, preferably at least $R^{102}$ and/or $R^{103}$ stand for a halogen substituent.

The following triarylalkylborate salts are very particularly preferred, where each K$^+$ is any organocation based on nitrogen, phosphorus, oxygen, sulfur or iodine:

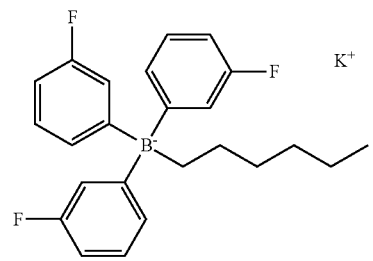

(VI)

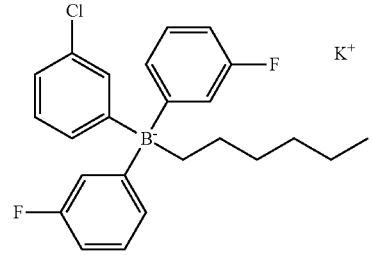

(VII)

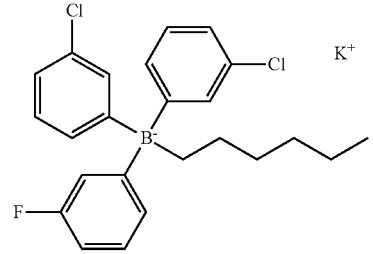

(VIII)

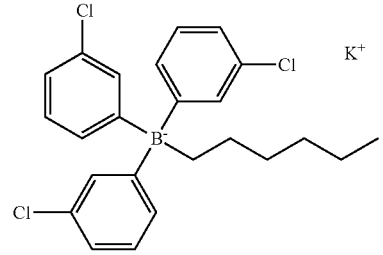

(IX)

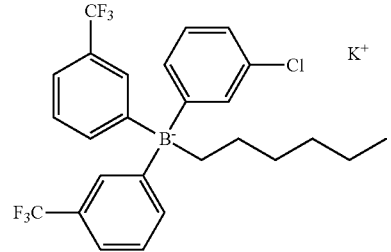

(X)

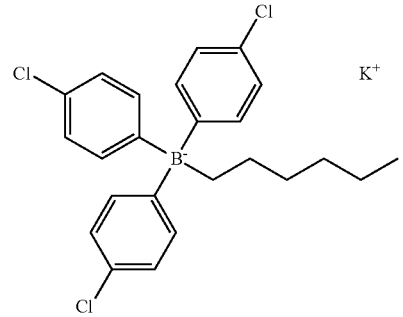

(XI)

(XII)

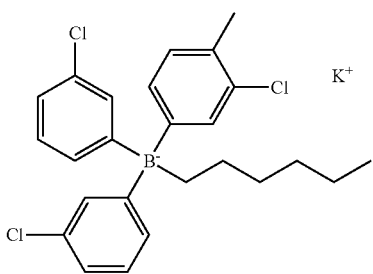

(XIII)

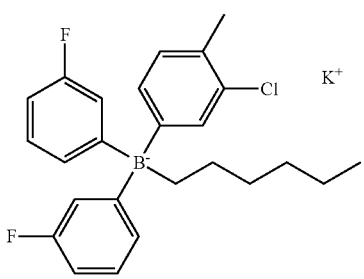

(XIV)

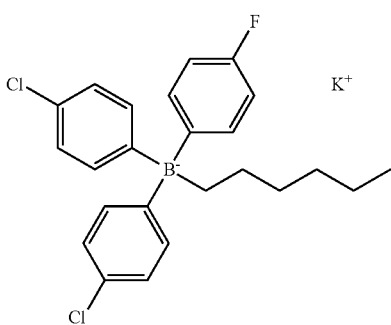

(XV)

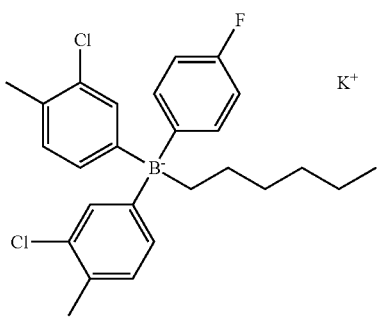

(XVI)

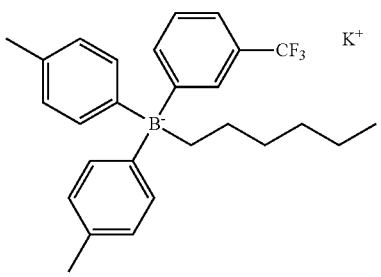

(XVII)

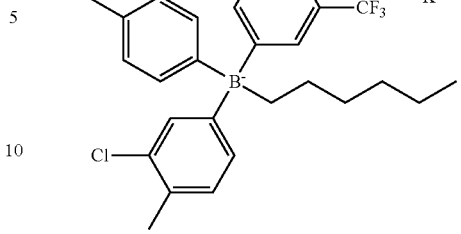

In a preferred embodiment of the photopolymer composition, the organocation K⁺ of the triarylalkylborate salt is a nitrogen- or phosphorus-based, mono- or divalent cation, preferably a nitrogen-based mono- or divalent cation, particularly preferably a monovalent ammonium cation.

In a preferred embodiment of the photopolymer composition, the at least one coinitiator has an oxidation potential in a range between 1.20 V vs. SCE and 1.36 V vs. SCE in acetonitrile, preferably between 1.25 V vs. SCE and 1.35 V vs. SCE and particularly preferably between 1.28 V vs. SCE and 1.34 V vs. SCE. In addition, K⁺ can be an organocation of valence n based on nitrogen, such as ammonium ions, pyridinium ions, pyridazinium ions, pyrimidinium ions, pyrazinium ions, imidazolium ions, pyrrolidinium ions, which optionally carry in one or more side chains further functional groups such as ethers, esters, amides and/or carbamates and which may also be present in oligomeric or polymeric or bridging form.

In addition, K⁺ can be an organocation of valence n based on phosphorus, such as an arbitrarily substituted tetraalkyl-phosphonium, trialkyl-aryl-phosphonium, dialkyl-diaryl-phosphonium, alkyl-triaryl-phosphonium, or tetraaryl-phosphonium cation, which optionally carries in one or more side chains further functional groups such as carbonyls, amides and/or carbamates and which may also be present in oligomeric or polymeric or bridging form.

In addition, K⁺ can be an organocation of valence n based on oxygen, such as an arbitrarily substituted pyrylium cation, which may also be present in annelated form such as in the benzopyrylium, flavylium, naphthoxanthenium cation, or a polymeric cation having the stated substitution patterns.

In addition, K⁺ can be an organocation of valence n based on sulfur, such as an onium compound of sulfur which may carry identical or different optionally substituted $C_4$ to $C_{14}$ alkyl, $C_6$ to $C_{10}$ aryl, $C_7$ to $C_{12}$ arylalkyl or $C_5$ to $C_6$ cycloalkyl radicals and/or establish oligomeric or polymeric repeating connecting units to construct sulfonium salts where $1 \leq n \leq 3$, or such as thiopyrylium cations or polymeric cations having the stated substitution patterns.

In addition, K⁺ can be an organocation of valence n based on iodine, such as an onium compound of iodine which may carry identical or different optionally substituted $C_1$ to $C_{22}$ alkyl, $C_6$ to $C_{14}$ aryl, $C_7$ to $C_{15}$ arylalkyl or $C_5$ to $C_7$ cycloalkyl radicals and/or establish oligomeric or polymeric repeating connecting units to construct iodonium salts where $1 \leq n \leq 3$, or such as further polymeric cations having the stated substitution patterns.

The photoinitiator system c) may also contain a further coinitiator cIII) such as trichloromethyl initiators, iodonium salts, sulfonium salts, aryl oxide initiators, bisimidazole initiators, ferrocene initiators, oxime initiators, thiol initiators or peroxide initiators.

It may be advantageous to use mixtures of these coinitiators and various dyes. Depending on the radiation source used, the type and concentration of the PIS must be adapted in a manner known to the person skilled in the art. For more information, see for example P. K. T. Oldring (Ed.), Chemistry & Technology of UV & EB Formulations For Coatings, Inks & Paints, Vol. 3, 1991, SITA Technology, London, pp. 61-328. It is particularly preferred if the PIS comprises a combination of dyes with absorption spectra which at least partially cover the spectral range from 400 to 1200 nm, with at least one coinitiator tuned to the dyes. It is also preferred if at least one photoinitiator suitable for a laser light color is contained in the photopolymer composition. It is further preferred also if the photopolymer composition contains a suitable photoinitiator for each of at least two laser light colors selected from the wavelength range of 400-1200 nm. Finally, it is especially preferred if the photopolymer composition contains a suitable photoinitiator for each of the laser light colors.

Another subject of the present invention is a photopolymer containing a photopolymer composition, in particular comprising matrix polymers, a writing monomer and a photoinitiator system which additionally contains a compound of the formula (XVI).

The statements made above with regard to the photopolymer composition according to the invention with regard to further preferred embodiments also apply analogously to the above-described photopolymer.

Another subject of the present invention relates to a layer structure comprising at least the following layers:
  A. a substrate layer A, which may be part of a further layer structure,
  B. a photopolymer layer B, formed from the photopolymer composition according to the invention, and
  C. a top layer C, which may be part of a further layer structure.

Another subject of the present invention relates to a layer structure comprising at least the following layers:
  A. a substrate layer A, which may be part of a further layer structure,
  B'. a cured photopolymer layer B', produced from the photopolymer composition according to the invention by curing by means of light, and
  C. a top layer C, which may be part of a further layer structure.

A method for producing a holographic medium using a disclosed photopolymer composition is also further disclosed. The photopolymer compositions can be used in particular for the production of holographic media in the form of a film. In this case, as carrier A, a stratum of a material transparent for light in the visible and NIR spectral range (transmission greater than 85% in the wavelength range from 400 to 1200 nm) or of such an assembly of materials is coated in the dark with the photopolymer composition B on one or both sides and, optionally, with a covering layer C applied on the one or more photopolymer strata B. Preferred materials or material assemblies for the carrier are based on polycarbonate (PC), polyethylene terephthalate (PET), polybutylene terephthalate, polyethylene, polypropylene, cellulose acetate, cellulose hydrate, cellulose nitrate, cycloolefin polymers, polystyrene, polyepoxides, polysulfone, cellulose triacetate (CTA), polyamide, polymethyl methacrylate, polyvinyl chloride, polyvinyl butyral or polydicyclopentadiene or mixtures thereof. They are more preferably based on PC, PET and CTA. Material assemblies may be film laminates or coextrudates. Preferred material assemblies are duplex and triplex films constructed according to one of the schemes A/B, A/B/A or A/B/C. Particular preference is given to PC/PET, PET/PC/PET and PC/TPU (TPU=thermoplastic polyurethane). The materials or material assemblies of the carrier may have been given a non-stick, antistatic, hydrophobized or hydrophilized finish on one or both sides. The stated modifications are used on the side facing the photopolymer layer B for the purpose that the photopolymer stratum B can be detached from the carrier A non-destructively. A modification of the side of the carrier facing away from the photopolymer stratum B serves to ensure that the media according to the invention meet specific mechanical requirements, which are required, for example, for processing in roller laminators, in particular in roll-to-roll processes.

In addition, a further method for producing a holographic medium using a photopolymer composition according to the invention is disclosed, which also provides holographic media in the form of films. In this case, as carrier A, a stratum of a material transparent for light in the visible and NIR spectral range (transmission greater than 85% in the wavelength range from 400 to 1200 nm) or of such an assembly of materials is applied in the dark with the photopolymer composition B on one side via 2D printing and, optionally, with a covering layer C on the one or more photopolymer strata B. All common inkjet technologies can be used here. If desired, in a targeted way, only the areas required for the function can be printed with the photopolymer composition B. Preferred materials or material assemblies of the carrier are based on glass, silicon (in the form of the highly polished wafers known from semiconductor technology), polycarbonate (PC), polyethylene terephthalate (PET), polybutylene terephthalate, polyethylene, polypropylene, cellulose acetate, cellulose hydrate, cellulose nitrate, cycloolefin polymers, polystyrene, polyepoxides, polysulfone, cellulose triacetate (CTA), polyamide, polymethyl methacrylate, polyvinyl chloride, polyvinyl butyral or polydicyclopentadiene or mixtures thereof. They are more preferably based on PC, PET and CTA. Material assemblies may be film laminates or coextrudates. Preferred material assemblies are duplex and triplex films constructed according to one of the schemes A/B, A/B/A or A/B/C. Particular preference is given to PC/PET, PET/PC/PET and PC/TPU (TPU=thermoplastic polyurethane). The materials or material assemblies of the carrier may have been given a non-stick, antistatic, hydrophobized or hydrophilized finish on one or both sides. The stated modifications are used on the side facing the photopolymer layer B for the purpose that the photopolymer stratum B can be detached from the carrier A non-destructively. A modification of the side of the carrier facing away from the photopolymer stratum B serves to ensure that the media according to the invention meet specific mechanical requirements, which are required, for example, for processing in roller laminators, in particular in roll-to-roll processes. Further disclosed are material assemblies according to the type described above, comprising a photocured photopolymer layer B', so forming duplex and triplex films according to a scheme A/B', A/B'/A or A/B/C.

It is possible to expose holographic information into such holographic media.

Another subject of the invention relates to a holographic medium containing a photopolymer composition according to the invention. Holographic media can be processed to holograms by appropriate exposure processes for optical applications in the NIR and in the total visible and near UV range (350-1500 nm). Holograms include all holograms that can be recorded by methods known to the person skilled in the art.

These include in-line (Gabor) holograms, off-axis holograms, full-aperture transfer holograms, white light transmission holograms ("rainbow holograms"), Denisyuk holograms, off-axis reflection holograms, edge-lit holograms and holographic stereograms. Reflection holograms, Denisyuk holograms, transmission holograms are preferred.

Another subject of the invention relates to a holographic medium which has been converted into a hologram, the hologram being selected from the group consisting of a reflection, transmission, in-line, off-axis, full-aperture transfer, white-light transmission, Denisyuk, off-axis reflection or edge-lit hologram and a holographic stereogram, preferably reflection, transmission or edge-lit hologram or a combination of at least two thereof, it being likewise possible for combinations of these hologram types or plurality of holograms of the same type independently of each other to be united in the same volume of the holographic medium (multiplexing).

Possible optical functions of the holograms which can be produced with the photopolymer compositions according to the invention correspond to the optical functions of light elements such as lenses, mirrors, deflecting mirrors, filters, diffuser lenses, diffraction elements, diffusers, light guides (waveguides), light deflectors, projection lenses and/or masks. Combinations of these optical functions can also be combined independently of one another in a hologram. Often these optical elements show a frequency selectivity, depending on how the holograms were exposed and what dimensions the hologram has.

Another subject of the invention relates to an optical display comprising a holographic medium according to the invention.

In addition, it is also possible by means of the holographic media to produce holographic images or diagrams, for example for personal portraits, biometric representations in security documents, or generally images or image structures for advertising, security labels, brand protection, branding, labels, design elements, decorations, illustrations, collectible cards, pictures and the like, and pictures that can represent digital data, including in combination with the products detailed above. Holographic images can have the impression of a three-dimensional image, but they can also represent image sequences, short films or a number of different objects, depending on the angle at which, on the (also moving) light source with which, etc., it is illuminated. Because of this variety of possible designs, holograms, especially volume holograms, constitute an attractive technical solution for the abovementioned application.

Another subject of the invention relates to the use of a holographic medium according to the invention for producing chip cards, identity documents, 3D images, product protection tags, labels, banknotes or holographically optical elements, in particular for optical displays or in media for the realization of methods selected from the group consisting of eye tracking, sensing, LIDAR, augmented reality, head-mounted display and virtual reality applications, in particular in the near infrared range, and a combination of at least two thereof.

The holographic media can be used for recording of in-line, off-axis, full-aperture transfer, white light transmission, Denisyuk, off-axis reflection or edge-lit holograms and also of holographic stereograms, especially for production of optical elements, images or image representations.

Holograms are accessible from holographic media according to the invention by means of appropriate exposure.

The following examples are used to explain the invention by way of illustration without limiting it to them.

Measurement Methods:

OH number: The specified OH numbers were determined in accordance with DIN 53240-2.

NCO value: The specified NCO values (isocyanate contents) were determined in accordance with DIN EN ISO 11909.

Measurement of the Holographic Properties DE and an of the Holographic Media by Means of Two-Beam Interference in a Reflection Arrangement:

The beam of a He—Ne laser (emission wavelength 633 nm) was converted into a parallel homogeneous beam using the space filter (SF) and together with the collimating lens (CL). The final cross sections of the signal and reference beam are fixed by the iris diaphragms (I). The diameter of the iris aperture is 0.4 cm. The polarization-dependent beam splitters (PBS) divide the laser beam into two coherent, equally polarized beams. The power of the reference beam was set to 0.5 mW and the power of the signal beam to 0.65 mW via the $\lambda/2$ plates. The powers were determined using the semiconductor detectors (D) with the sample removed. The angle of incidence ($\alpha_0$) of the reference beam is $-21.8°$, and the angle of incidence ($\beta_0$) of the signal beam is $41.8°$. The angles are measured proceeding from the sample normal to the beam direction. According to FIG. 1, therefore, $\alpha_0$ has a negative sign and $\beta_0$ has a positive sign. At the location of the sample (medium), the interference field of the two overlapping beams produced a pattern of light and dark strips perpendicular to the angle bisectors of the two beams incident on the sample (reflection hologram). The strip spacing $\Lambda$, also called grating period, in the medium is ~225 nm (the refractive index of the medium assumed to be ~1.504).

FIG. 1 shows the holographic experimental setup with which the diffraction efficiency (DE) of the media was measured, with FIG. 1 representing the geometry of a holographic media tester (HMT) at $\lambda=633$ nm (He—Ne laser): M=mirror, S=shutter, SF=space filter, CL=collimator lens, $\lambda/2=\lambda/2$ plate, PBS=polarization-sensitive beam splitter, D=detector, I=iris, $\alpha_0=-21.8°$, $\beta_0=41.8°$ are the incidence angles of the coherent beams measured outside the sample (of the medium). RD=reference direction of the turntable.

Holograms were written into the medium in the following manner:

Both shutters(S) are open for exposure time t.

Thereafter, the medium was allowed 5 minutes' time for the diffusion of the as yet unpolymerized writing monomers, with closed shutters(S).

The written holograms were then read out in the following manner. The shutter of the signal beam remained closed. The shutter of the reference beam was open. The iris diaphragm of the reference beam was closed to a diameter of <1 mm. This ensured that the beam was always completely within the previously written hologram for all angles of rotation ($\Omega$) of the medium. The turntable, under computer control, then swept over the angle range from $\Omega_{min}$ to $\Omega_{max}$ with an angle step width of $0.05°$. $\Omega$ is measured from the sample normal to the reference direction of the turntable. The reference direction of the turntable is obtained when the angles of incidence of the reference beam and of the signal beam have the same absolute value during writing of the hologram, i.e. $\alpha_0=-31.80$ and $\beta_0=31.8°$. In that case, $\Omega_{recording}=0°$. For $\alpha_0=-21.8°$ and $\beta_0=41.8°$, $\Omega_{recording}$ is therefore $10°$. In general, for the interference field during writing ("recording") of the hologram:

$$\alpha_0=\theta_0+\Omega_{recording}. \quad (2)$$

$\theta_0$ is the half-angle in the laboratory system outside the medium and during writing of the hologram:

$$\theta_0 = \frac{\alpha_0 - \beta_0}{2}. \tag{3}$$

In this case, therefore, $\theta_0 = -31.8°$. At each setting for the angle of rotation $\Omega$, the powers of the beam transmitted into the zeroth order were measured by means of the corresponding detector D, and the powers of the beam diffracted in the first order by means of the detector D. The diffraction efficiency was calculated at each setting of angle $\Omega$ as the quotient of:

$$\eta = \frac{P_D}{P_D + P_T} \tag{4}$$

$P_D$ is the power in the detector of the diffracted beam and $P_T$ is the power in the detector of the transmitted beam.

By means of the method described above, the Bragg curve, which describes the diffraction efficiency $\eta$ as a function of the rotation angle $\Omega$, of the written hologram, was measured and stored in a computer. In addition, the intensity transmitted into the zeroth order was also recorded against the rotation angle $\Omega$ and stored in a computer.

The maximum diffraction efficiency (DE=$\eta_{max}$) of the hologram, i.e., its peak value, was determined at $\Omega_{reconstruction}$. In some cases, it was necessary for this purpose to change the position of the detector for the diffracted beam in order to determine this maximum value.

The refractive index contrast $\Delta n$ and the thickness d of the photopolymer layer were then determined using the Coupled Wave Theory (see: H. Kogelnik, The Bell System Technical Journal, volume 48, November 1969, number 9, page 2909-page 2947) to the measured Bragg curve and the angular course of the transmitted intensity. It should be noted that due to the shrinkage of thickness caused by photopolymerization, the strip spacing $\Lambda'$ of the hologram and the orientation of the strips (slant) may deviate from the strip spacing $\Lambda$ of the interference pattern and its orientation. Accordingly, the angle $\alpha_0'$ or the corresponding angle of the turntable $\Omega_{reconstruction}$ at which maximum diffraction efficiency is achieved will also deviate from do or from the corresponding $\Omega_{recording}$. This alters the Bragg condition. This alteration is taken into account in the evaluation process. The evaluation process is described hereinafter:

All geometric quantities that refer to the written hologram and not to the interference pattern are represented as quantities with primes.

For the Bragg curve $\eta(\Omega)$ of a reflection hologram, according to Kogelnik:

$$\eta = \begin{cases} \dfrac{1}{1 - \dfrac{1-(\xi/\nu)^2}{\sin^2\left(\sqrt{\xi^2 - \nu^2}\right)}}, & \text{for } \nu^2 - \xi^2 < 0 \\ \dfrac{1}{1 - \dfrac{1-(\xi/\nu)^2}{\sinh^2\left(\sqrt{\nu^2 - \xi^2}\right)}}, & \text{for } \nu^2 - \xi^2 \geq 0 \end{cases} \tag{5}$$

with:

$$\nu = \frac{\pi \cdot \Delta n \cdot d'}{\lambda \cdot \sqrt{|c_s \cdot c_r|}} \tag{6}$$

$$\xi = -\frac{d'}{2 \cdot c_s} \cdot DP \tag{7}$$

$$c_s = \cos(\vartheta') - \cos(\psi') \cdot \frac{\lambda}{n \cdot \Lambda'} \tag{8}$$

$$c_r = \cos(\upsilon') \tag{9}$$

$$DP = \frac{\pi}{\Lambda'} \cdot \left(2 \cdot \cos(\psi' - \vartheta') - \frac{\lambda}{n \cdot \Lambda'}\right) \tag{10}$$

$$\psi' = \frac{\beta' + \alpha'}{2} \tag{11}$$

$$\Lambda' = \frac{\lambda}{2 \cdot n \cdot \cos(\psi' - \alpha')} \tag{12}$$

When the hologram is read out ("reconstruction"), the following applies, in analogy to above:

$$\upsilon'_0 = \theta_0 + \Omega \tag{13}$$

$$\sin(\upsilon'_0) = n \cdot \sin(\upsilon') \tag{14}$$

At the Bragg condition, the "dephasing" is DP=0. And it follows correspondingly that:

$$\alpha'_0 = \theta_0 + \Omega_{reconstruction} \tag{15}$$

$$\sin(\alpha'\theta) = n \cdot \sin(\alpha') \tag{16}$$

The still unknown angle $\beta'$ can be determined by comparing the Bragg condition of the interference field when writing the hologram and the Bragg condition when reading out the hologram, assuming that only thickness shrinkage occurs. It then follows that:

$$\sin(\beta') = \frac{1}{n} \cdot [\sin(\alpha_0) + \sin(\beta_0) - \sin(\theta_0 + \Omega_{reconstruction})] \tag{17}$$

$\nu$ is the grating intensity, $\xi$ is the detuning parameter, and $\psi'$ is the orientation (slant) of the refractive index grating that was written. $\alpha'$ and $\beta'$ correspond to the angles $\alpha_0$ and $\beta_0$ of the interference field on writing of the hologram, but measured in the medium and valid for the grating of the hologram (after shrinkage of thickness). n is the mean refractive index of the photopolymer and was set to 1.504. $\lambda$ is the wavelength of the laser light in a vacuum.

The maximum diffraction efficiency (DE=$\eta_{max}$) for $\xi=0$ is then:

$$DE = \tanh^2(\nu) = \tanh^2\left(\frac{\pi \cdot \Delta n \cdot d'}{\lambda \cdot \sqrt{\cos(\alpha')\cos(\alpha' - 2\psi')}}\right) \tag{18}$$

Figure 2:
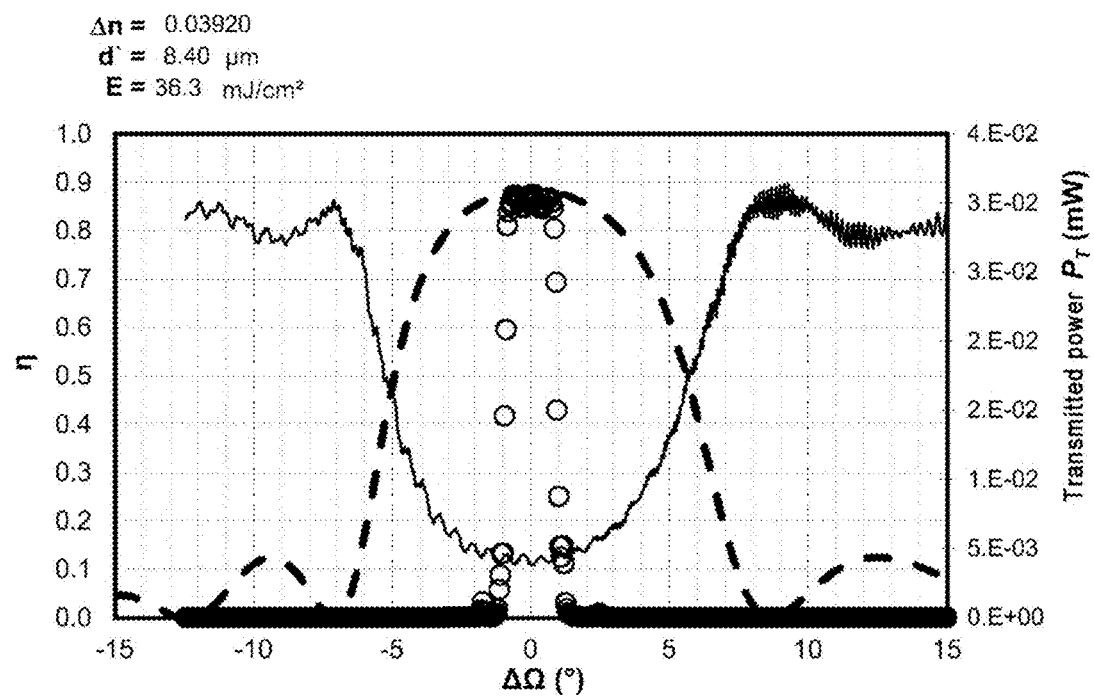
FIG. 2 shows the plot of the Bragg curve η according to the Coupled Wave Theory (broken line), the measured diffraction efficiency (filled circles) and the transmitted power (black solid line) against the angle detuning ΔΩ.

The measured data for the diffraction efficiency, the theoretical Bragg curve and the transmitted intensity are, as shown in FIG. 2, plotted against the centered angle of rotation $\Delta\Omega \equiv \Omega_{reconstruction} - \Omega = \alpha'_0 = \upsilon'_0$, also called angle detuning. FIG. 2 shows the measured transmitted power $P_T$ (right y-axis) plotted as a solid line (here of Example 27b) against the angle detuning $\Delta\Omega$, the measured diffraction efficiency η (left y-axis) plotted as filled circles against the angle detuning $\Delta\Omega$ (as far as the finite size of the detector allowed), and the fitting to the Kogelnik theory as a dashed line (left y-axis).

As DE is known, the shape of the theoretical Bragg curve according to Kogelnik is only determined by the thickness d' of the photopolymer layer. Δn is corrected via DE for given thickness d' in such a way that measurement and theory of DE always match. d' is now adjusted until the angular positions of the first minor minima of the theoretical Bragg curve correspond to the angular positions of the first minor maxima of the transmitted intensity and also until the full width at half maximum (FWHM) for the theoretical Bragg curve and for the transmitted intensity match.

Since the direction in which a reflection hologram also rotates when reconstructed by means of an $\Omega$ scan, but the detector for the diffracted light can cover only a finite angle range, the Bragg curve of broad holograms (small d') is not fully covered in an $\Omega$ scan, but rather only the central region, given suitable detector positioning. Therefore, the shape of the transmitted intensity, which is complementary to the Bragg curve, is additionally employed for adjustment of the layer thickness d'.

FIG. 2 shows the plot of the Bragg curve n according to the Coupled Wave Theory (broken line), the measured diffraction efficiency (filled circles) and the transmitted power (black solid line) against the angle detuning $\Delta\Omega$.

For a formulation, this procedure may have been repeated several times for different exposure times t on different media in order to determine that mean energy dose of the incident laser beam at which DE passes into the saturation value on writing of the hologram. The mean energy dose E is obtained as follows from the powers of the two partial beams assigned to the angles $\alpha_0$ and $\beta_0$ (reference beam with $P_r$=0.50 mW and signal beam with $P_s$=0.63 mW), the exposure time t and the diameter of the iris diaphragm (0.4 cm):

$$E(mJ/cm^2) = \frac{2 \cdot [P_r + P_s] \cdot t(s)}{\pi \cdot 0.4^2 cm^2} \quad (19)$$

The powers of the component beams were adjusted such that the same power density is attained in the medium at the angles $\alpha_0$ and $\beta_0$ used.

Calculation of the Reduction Potential of Triarylalkylborates:

The absolute reduction potential ($E_{red}^{calculated}$), referenced against the saturated calomel electrode, was calculated using the following formula (20):

$$E_{red}^{calculated} = -\frac{(G_{298} - G_{298}(\text{oxidized}))}{n_e F} - E_{1/2}^{0,SHE} + E_{1/2}^{0,SCE}. \quad (20)$$

Here, $n_e$ is the number of transferred electrons (here always $n_e$=1), F is the Faraday constant (F=23.061 kcal mol$^{-1}$ V$^{-1}$), $E_{1/2}^{0,SCE}$ the absolute potential of the standard hydrogen electrode (SHE) ($E_{1/2}^{0,SHE}$=−4.281 V), $E_{1/2}^{0,SHE}$ the potential of the saturated calomel electrode (SCE) relative to the SHE in acetonitrile ($E_{1/2}^{0,SCE}$=−0.141 V) and $G_{298}$ and $G_{298}$ (oxidized) each the calculated Gibbs energies at 298 K of the ground state and of the oxidized state of the coinitiator, in particular of the triarylalkylborate.

The formula (20) can also be expressed as follows after the above-stated constants have been inserted (formula (1)):

$$E_{ox}^{calculated} = -\frac{(G_{298} - G_{298}(\text{oxidized}))}{23.061 \frac{\text{kcal}}{\text{mol} \cdot \text{V}}} + 4.14 \text{ V}. \quad (1)$$

The calculation of the Gibbs energies at 298 K of the ground state and of the oxidized state was carried out according to the following procedure: First, using ChemDraw 3D, the three-dimensional molecular geometry of the coinitiator, in the form of a triarylalkylborate was generated and this geometry was subjected to a conformer analysis. The conformers found were energetically minimized by means of the AM1 force field and the coordinates of the molecular geometries obtained (usually only one conformer was obtained) were used for the calculation of the electronic energy. The electronic ground state was geometry-optimized in a suitable solvent (PCM approach for acetonitrile) and the absolute electronic energies of the optimized structures were determined and corrected for the influence of the solvent field ($G_{298}$). Subsequently, the thus-optimized molecular geometry was reduced by one electron and the absolute electronic energy of the oxidized molecule—also calculated in acetonitrile (PCM method)—was determined again ($G_{298}$ (oxidized)).

Substances:

The solvents, reagents and all bromoaromatics used were purchased from chemical suppliers. The bromoaromatics were freshly distilled where appropriate. Anhydrous solvents contain <50 ppm of water.

Polyol 1 was prepared with an OH number of 56.8, as described in WO2015091427.

Desmodur® N 3900 product of Covestro A G, Leverkusen, D E, hexanediisocyanate-based polyisocyanate, iminooxadiazinedione content at least 30%, NCO content: 23.5%.

Iron (III) trifluoroacetylacetonate [14526-22-8] is available from ABCR GmbH & Co. KG, Karlsruhe, Germany.

Urethane acrylate 1 (phosphorothioyltris(oxybenzene-4,1-diylcarbamoyloxyethane-2,1-diyl) trisacrylate, [1072454-85-3]) was prepared a described in WO2015091427.

Urethane acrylate 2 (2-({[3-(methylsulfanyl)phenyl]carbamoyl}oxy)-ethyl prop-2-enoate, [1207339-61-4]) was prepared as described in WO2015091427.

Additive 1 (bis(2,2,3,3,4,4,5,5,6,6,7,7-dodecafluoroheptyl)-(2,2,4-trimethylhexane-1,6-diyl)biscarbamate [1799437-41-4] was prepared as described in WO2015091427.

Dye 1 (3,7-bis(diethylamino) phenoxazin-5-ium bis(2-ethylhexyl) sulfosuccinate)) was prepared as described in WO 2012062655.

Cation 2 ($N_1,N_{22}$-dihexadecyl-$N_1,N_1,N_{22},N_{22}$,10,10,13-heptamethyl-7,16-dioxo-3,6,17,20-tetraoxa-8,15-diazadocosane-1,22-diaminium dibromide) was prepared as described in WO 2018087064.

BYK-310 silicone-containing surface additive, product of BYK-Chemie GmbH, Wesel, Germany.

Tinuvin® 400 UV absorber, product of BASF SE, Ludwigshafen, Germany.

Synthesis Protocols:

Preparation Protocol for N,N-Dimethyl-N-(3-Phenylpropyl) Hexadecylammonium Chloride (Cation 1):

1.28 mol of dimethylcetylamine were dissolved in 2.4 L of tert-butyl methyl ether (MTBE) in a 5 L flange vessel at 30° C. 1.28 mol of 3-chlorophenylpropane were added dropwise to this solution at a rate such that the reaction temperature does not exceed 40° C. After the end of metered addition, the reaction solution was stirred for 5 h at 90° C., then cooled to 40° C. over the period of 1 h and transferred to suitable vessels for crystallization. The crystals that formed overnight were isolated, washed with 500 mL of cold MTBE and dried. A colorless solid was obtained (450 g, 83% of theory) with a melting point at 59° C.

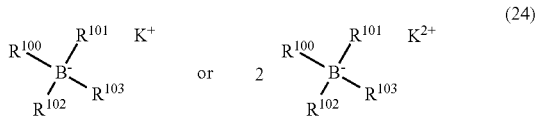

(24)

Preparation Protocol for Tetrabutylammonium Triarylalkylborates with $R^{101}=R^{102}=R^{103}$:

In a four-neck flask with thermometer, reflux condenser, dropping funnel and magnetic stirrer, the corresponding diisopropylalkylborate (1.0 eq.) and magnesium turnings (3 eq.) were introduced in a solvent mixture consisting of dry toluene and dry THF (5.8:1, 1.9 M). This mixture was stirred for 30 min at room temperature. The corresponding bromoaromatic (3 eq.) was then initially added dropwise, undiluted, to the mixture until ensuing exothermy signals the start of reaction, but a maximum of 10% of the undiluted bromoaromatic was used for this purpose. The rest of the bromoaromatic was added dropwise to the reaction solution in a solvent mixture consisting of dry toluene and dry THF (1:1, dilution of total molarity to 0.4 M) at a rate such that the reaction temperature did not exceed 45° C. After the end of addition, the reaction solution was heated under reflux to full dissolution of the magnesium or 1 h. The reaction solution was cooled to room temperature and discharged onto a mixture of ice water and tetrabutylammonium bromide (1 eq.). The mixture was stirred for 1 h and then the organic phase was separated off. The organic phase was washed with water until a halide test (HNO₃ (aq., 10%)+AgNO₃) was negative. The solvents were removed in vacuo on a rotary evaporator and the crude product was recrystallized from methanol.

Preparation Protocol for Tetrabutylammonium Triarylalkylborates with $R^{101}=R^{102}\neq R^{103}$:

In a four-neck flask with thermometer, reflux condenser, dropping funnel and magnetic stirrer, the corresponding diisopropylalkylborate (1.0 eq.) and magnesium turnings (3 eq.) were introduced in a solvent mixture consisting of dry toluene and dry THF (4:1, 1.9 M). This mixture was stirred for 30 min at room temperature. The first bromoaromatic (1 eq.) was then initially added dropwise, undiluted, to the mixture until ensuing exothermy signals the start of reaction, but a maximum of 10% of the undiluted bromoaromatic was used for this purpose. The rest of the bromoaromatic was added dropwise to the reaction solution in a solvent mixture consisting of dry toluene and dry THF (1.1:1, dilution of total molarity to 0.7 M) at a rate such that the reaction temperature of 45° C. was not exceeded. After complete addition, the reaction solution was stirred for 1 h at RT. The corresponding second bromoaromatic was then initially added dropwise, undiluted, to the mixture until ensuing exothermy signaled the start of reaction, but a maximum of 10% of the undiluted bromoaromatic was used for this purpose. The rest of the bromaromatic in the residual solvent mixture consisting of dry toluene and dry THF (1.1:1, dilution of total molarity to 0.4 M) was again added dropwise to the reaction solution at a rate such that the reaction temperature of 45° C. was not exceeded. After the end of addition, the reaction solution was heated under reflux to full dissolution of the magnesium or 1 h. The reaction solution was cooled to room temperature and discharged onto a mixture of ice water and tetrabutylammonium bromide (1 eq.). The mixture was stirred for 1 h and the organic phase was separated off. The organic phase was washed with water until a halide test (HNO₃ (aq., 10%)+AgNO₃) was negative. The solvents were removed in vacuo on a rotary evaporator and the crude product was recrystallized from methanol.

Preparation Protocol for Triarylalkylborates with Cations of Valence n=1:

The corresponding tetrabutylammonium triarylalkylborate (1 eq.) was dissolved in butyl acetate (0.04 M) and admixed with an aqueous solution of the corresponding cation (halide salt, 1.05 eq., 0.05 M) and sodium bis(2-ethylhexyl) sulfosuccinate (0.05 eq.) and the mixture was stirred for 1 h at RT. After phase separation, the organic phase was washed repeatedly with water until a halide test (HNO₃ (aq., 10%)+AgNO₃) was negative. The solvent was removed in vacuo on a rotary evaporator and the product is dried under reduced pressure.

Preparation Protocol for Triarylalkylborates with Cations of Valence n=2:

The corresponding tetrabutylammonium triarylalkylborate (1 eq.) was dissolved in butyl acetate (0.04 M) and admixed with an aqueous solution of the corresponding cation (halide salt, 0.525 eq., 0.05 M) and sodium bis(2-ethylhexyl) sulfosuccinate (0.05 eq.) and the mixture was stirred for 1 h at RT. After phase separation, the organic phase was washed repeatedly with water until a halide test (HNO₃ (aq., 10%)+AgNO₃) was negative. The solvent was removed in vacuo on a rotary evaporator and the product is dried under reduced pressure.

Production Protocol for Photopolymer Film/Holographic Media:

12.4 g of the polyol component 1 described above were melted and mixed in the dark with 6.6 g of urethane acrylate 1, 6.6 g of urethane acrylate 2 described above, 9.2 g of the fluorinated urethane described above (additive 1), 0.86 g of the respective borate salt described above, 0.14 g of dye 1, 0.12 g of BYK-310, 0.01 g of iron(III) trifluoroacetylacetonate, 2.4 g of the additive Tinuvin® 400 and 19.2 g of ethyl acetate to give a clear solution. Then 2.3 g of Desmodur® N 3900 were added and mixing was repeated. This solution was placed in the dark on a roll-to-roll coating line onto a 60 μm thick TAC film and applied by means of a doctor blade in such a way that a wet film thickness range of 12-14 μm was achieved. At a drying temperature of 120° C. and in a drying time of 4 minutes, the coated film was dried and then protected with a 40 μm thick polyethylene film. This film was then packaged in a light-protected manner.

Preparation of N-benzyl-N,N-dimethylhexadecylammonium 3-chlorophenyldi(3-fluoro phenyl)hexylborate:

In accordance with the general preparation protocol for tetrabutylammonium triarylhexylborates with $R^{101}=R^{102}\neq R^{103}$, 3-chlorobromobenzene (1 eq.) and 3-fluorobromobenzene (2 eq.) were reacted with diisopropylhexyl borate. Subsequently, in accordance with the general preparation protocol for triarylalkylborates with cations of valence n=1, the resulting tetrabutylammonium triarylalkylborate was reacted with N-benzyl-N,N-dimethylhexadecylammonium chloride hydrate. A colorless oil (3.8 g, 24% of theory over two stages) was obtained with a signal in the $^{11}$B NMR spectrum at δ (ppm) (CDCl$_3$)=−10.1 ppm. The calculated reduction potential was $E_{ox}$=1.29 V vs. SCE in acetonitrile.

Preparation of a Photopolymer with N-benzyl-N,N-dimethylhexadecylammonium 3-chlorophenyldi-(3-fluorophenyl) hexylborate (Example 22 in Table 2):

In accordance with the general preparation protocol for photopolymer films, a photopolymer was prepared with N-benzyl-N,N-dimethylhexadecylammonium 3-chlorophenyldi(3-fluorophenyl)hexylborate as a coinitiator.

Preparation of tetrabutylammonium tri(3-chlorophenyl)hexylborate:

In accordance with the general preparation protocol for tetrabutylammonium triarylhexylborates with $R^{101}$=$R^{102}$=$R^{103}$, 3-chlorobromobenzene was reacted with diisopropylhexyl borate. Colorless crystals (56 g, 50% of theory) were obtained with a signal in the $^{11}$B NMR spectrum at δ (ppm) (CDCl$_3$)=−9.9 ppm. The calculated reduction potential was $E_{ox}$=1.32 V vs. SCE in acetonitrile.

Preparation of a Photopolymer with tetrabutylammonium tri(3-chlorophenyl)hexylborate (Example 27a in Table 2):

In accordance with the general preparation protocol for photopolymer films, a photopolymer was prepared with tetrabutylammonium tri(3-chlorophenyl)hexylborate as a coinitiator.

Preparation of N-benzyl-N,N-dimethylhexadecylammonium tri(3-chlorophenyl)hexylborate:

In accordance with the general preparation protocol for tetrabutylammonium triarylhexylborates with $R^{101}$=$R^{102}$=$R^{103}$, 3-chlorobromobenzene was reacted with diisopropylhexyl borate. Subsequently, the general preparation protocol for triarylalkylborates with cations of valence n=1 was followed using N-benzyl-N,N-dimethylhexadecylammonium chloride hydrate. A colorless oil (2.5 g, 50% of theory over two stages) was obtained with a signal in the $^{11}$B NMR spectrum at δ (ppm) (CDCl$_3$)=−10.1 ppm. The calculated reduction potential was $E_{ox}$=1.32 V vs. SCE in acetonitrile.

Preparation of a Photopolymer with N-benzyl-N,N-dimethylhexadecylammonium tri(3-chlorophenyl)hexylborate (Example 27b in Table 2):

In accordance with the general preparation protocol for photopolymer films, a photopolymer was prepared with N-benzyl-N,N-dimethylhexadecylammonium tri(3-chlorophenyl)hexylborate as a coinitiator.

Preparation of N-(3-phenylpropyl)-N,N-dimethylhexadecylammonium tri(3-chlorophenyl)-hexylborate:

In accordance with the general preparation protocol for tetrabutylammonium triarylhexylborates with $R^{101}$=$R^{102}$=$R^{103}$, 3-chlorobromobenzene was reacted with diisopropylhexyl borate. Subsequently, the general preparation protocol for triarylalkylborates with cations of valence n=1 was followed using cation 1. A colorless oil (2.6 g, 50% of theory over two stages) was obtained with a signal in the $^{11}$B NMR spectrum at δ (ppm) (CDCl$_3$)=−10.1 ppm. The calculated reduction potential was $E_{ox}$=1.32 V vs. SCE in acetonitrile.

Preparation of a Photopolymer with N,N-dimethyl-N-(3-phenylpropyl)hexadecylammonium tri(3-chlorophenyl)hexylborate (Example 27c in Table 2):

In accordance with the general preparation protocol for photopolymer films, a photopolymer was prepared with N,N-dimethyl-N-(3-phenylpropyl)hexadecylammonium tri(3-chlorophenyl)hexylborate as a coinitiator.

Preparation of tributyltetradecylphosphonium tri(3-chlorophenyl)hexylborate:

In accordance with the general preparation protocol for tetrabutylammonium triarylhexylborates with $R^{101}$=$R^{102}$=$R^{103}$, 3-chlorobromobenzene was reacted with diisopropylhexyl borate. Subsequently, the general preparation protocol for triarylalkylborates with cations of valence n=1 was followed using tributyltetradecylphosphonium bromide. A colorless oil (0.86 g, 33% of theory over two stages) was obtained with a signal in the $^{11}$B NMR spectrum at δ (ppm) (CDCl$_3$)=−10.1 ppm. The calculated reduction potential was $E_{ox}$=1.32 V vs. SCE in acetonitrile.

Preparation of a Photopolymer with tributyltetradecylphosphonium tri(3-chlorophenyl)hexylborate (Example 27d in Table 2):

In accordance with the general preparation protocol for photopolymer films, a photopolymer was prepared with tributyltetradecylphosphonium tri(3-chlorophenyl)hexylborate as a coinitiator.

Preparation of $N_1,N_{22}$-dihexadecyl-$N_1,N_1,N_{22},N_{22}$,10,10,13-heptamethyl-7,16-dioxo-3,6,17,20-tetraoxa-8,15-diazadocosane-1,22-diaminium bistri(3-chlorophenyl)hexylborate:

In accordance with the general preparation protocol for tetrabutylammonium triarylhexylborates with $R^{101}$=$R^{102}$=$R^{103}$, 3-chlorobromobenzene was reacted with diisopropylhexyl borate as a bromoaromatic. Subsequently, the general preparation protocol for triarylalkylborates with cations of valence n=2 was followed using cation 2. A colorless oil (3.98 g, 48% of theory over two stages) was obtained with a signal in the $^{11}$B NMR spectrum at δ (ppm) (CDCl$_3$)=−10.1 ppm. The calculated reduction potential was $E_{ox}$=1.32 V vs. SCE in acetonitrile.

Preparation of a Photopolymer with $N_1,N_{22}$-dihexadecyl-$N_1,N_1,N_{22},N_{22}$,10,10,13-heptamethyl-7,16-dioxo-3,6,17,20-tetraoxa-8,15-diazadocosane-1,22-diaminium bis-tri(3-chlorophenyl)hexylborate (Example 27e in Table 2):

In accordance with the general production protocol for photopolymer films, a photopolymer was prepared with $N_1,N_{22}$-dihexadecyl-$N_1,N_1,N_{22},N_{22}$,10,10,13-heptamethyl-7,16-dioxo-3,6,17,20-tetraoxa-8,15-diazadocosane-1,22-diaminium bis-tri(3-chlorophenyl)hexylborate as a coinitiator.

Preparation of N-benzyl-N,N-dimethylhexadecylammonium di(3-chlorophenyl)-3-fluorophenylhexylborate:

In accordance with the general preparation protocol for tetrabutylammonium triarylhexylborates with $R^{101}$=$R^{102}$≠$R^{103}$, 3-chlorobromobenzene (2 eq.) and 3-fluorobromobenzene (1 eq.) were reacted with diisopropylhexyl borate. Subsequently, the general preparation protocol for triarylalkylborates with cations of valence n=1 was followed using N-benzyl-N,N-dimethylhexadecylammonium chloride hydrate. A colorless oil (3.0 g, 29% of theory over two stages) was obtained with a signal in the $^{11}$B NMR spectrum at δ (ppm) (CDCl$_3$)=−10.1 ppm. The calculated reduction potential was $E_{ox}$=1.34 V vs. SCE in acetonitrile.

Preparation of a Photopolymer with N-benzyl-N,N-dimethylhexadecylammonium di(3-chlorophenyl)-3-fluorophenylhexylborate (Example 32 in Table 2):

In accordance with the general preparation protocol for photopolymer films, a photopolymer was prepared with N-benzyl-N,N-dimethylhexadecylammonium di(3-chlorophenyl)-3-fluorophenylhexylborate as a coinitiator.

Non-Inventive Examples (NEB):
Preparation of N-benzyl-N,N-dimethylhexadecylammonium tri(3-chloro-4-methylphenyl)-hexylborate:

The preparation protocol published in WO 2018/099698 was used. The calculated reduction potential was $E_{ox}$=1.15 V vs. SCE in acetonitrile.

Preparation of a Photopolymer with N-benzyl-N,N-dimethylhexadecylammonium tri(3-chloro-4-methylphenyl)hexylborate (Example NEB1 in Table 2):

In accordance with the general production protocol for photopolymer films, a photopolymer was prepared as with N-benzyl-N, N-dimethylhexadecylammonium tri(3-chloro-4-methylphenyl)hexylborate as a coinitiator.

Preparation of N,N-dimethyl-N-(3-phenylpropyl)hexadecylammonium tri(4-trifluoromethylphenyl)hexylborate:

In accordance with the general preparation protocol for tetrabutylammonium triarylhexylborates with $R^{101}=R^{102}=R^{103}$, 3-bromobenzene trifluoride was reacted with diisopropylbutyl borate. Subsequently, the general production protocol for triarylalkylborates with cations of valence n=1 was followed using cation 1. A colorless oil (2.5 g, 22% of theory over two stages) was obtained with a signal in the $^{11}$B NMR spectrum at δ (ppm) (CDCl$_3$)=−10.0 ppm. The calculated reduction potential was $E_{ox}$=1.45 V vs. SCE in acetonitrile.

Preparation of a Photopolymer with N,N-dimethyl-N-(3-phenylpropyl)hexadecylammonium tri(4-trifluoromethylphenyl)hexylborate (Example NEB2 in Table 2):

In accordance with the general production protocol for photopolymer films, a photopolymer was prepared with N,N-dimethyl-N-(3-phenylpropyl)hexadecylammonium tri(4-trifluoromethylphenyl)hexylborate as a coinitiator.

Examples

The oxidation potential of different trialkylaryl borates according to the invention and not according to the invention was calculated by means of the above-stated method for calculating the oxidation potential of triarylalkylborates with the software package GAMESS (G. M J. Barca, C. Bertoni, L. Carrington, D. Datta, N. De Silva, J. E. Deustua, D. G. Fedorov, J. R. Gour, A. O. Gunina, E. Guidez, T. Harville, S. Irle, J. Ivanic, K. Kowalski, S. S. Leang, H. Li, W. L., J. J. Lutz, I. Magoulas, J. Mato, V. Mironov, H. Nakata, B. Q. Pham, P. Piecuch, D. Poole, S. R. Pruitt, A. P. Rendell, L. B. Roskop, K. Ruedenberg, T. Sattasathuchana, M. W. Schmidt, J. Shen, L. Slipchenko, M. Sosonkina, V. Sundriyal, A. Tiwari, J. L. Galvez Vallejo, B. Westheimer, M. Wloch, P. Xu, F. Zahariev, M. S. Gordon; J. Chem. Phys. 152; 154102 (2020)). The results of these calculations are listed in the following table. For the calculation of the oxidation potential, the cation of the corresponding trialkylarylborate is irrelevant, and so the values listed below apply to salts of the following general structure:

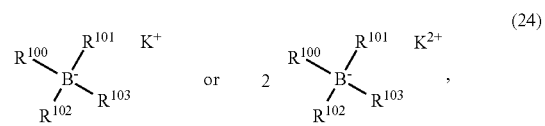

(24)

where K$^+$ or K$^{2+}$ represents any ammonium or phosphonium cation.

Table 1. Oxidation potentials of various triarylalkylborate anions calculated according to formula 1, where the specified radicals refer to the above general structures of formula (24) and the oxidation potential in V is reported in comparison to the saturated calomel electrode in the solvent acetonitrile.

| Example | R$^{100}$ | R$^{101}$ | R$^{102}$ | R$^{103}$ | Eox (calculated) |
|---|---|---|---|---|---|
| 1 | n-hexyl | 2-Cl-4-methylphenyl | 2-Cl-4-methylphenyl | 4-F-phenyl | 1.16 |
| 2 | n-hexyl | 3-CN-biphenyl | 3-CN-biphenyl | 3-CN-biphenyl | 1.16 |
| 3 | n-hexyl | phenyl | phenyl | 3-CCl$_3$-phenyl | 1.16 |
| 4 | n-hexyl | phenyl | phenyl | 3-CF$_3$-phenyl | 1.17 |

-continued

| Example | $R^{100}$ | $R^{101}$ | $R^{102}$ | $R^{103}$ | Eox (calculated) |
|---|---|---|---|---|---|
| 5 | n-hexyl | 4-Cl-phenyl | 4-Cl-phenyl | 4-Cl-phenyl | 1.17 |
| 6 | n-hexyl | 4-Cl-phenyl | 4-Cl-phenyl | 4-F-phenyl | 1.18 |
| 7 | n-hexyl | 2-Cl-phenyl | 2-Cl-phenyl | 2-Cl-phenyl | 1.18 |
| 8 | n-hexyl | 3-Cl-4-methyl-phenyl | 3-Cl-4-methyl-phenyl | 3-CF$_3$-phenyl | 1.20 |
| 9 | n-hexyl | 3-Cl-phenyl | 3-Cl-phenyl | 3-Cl-4-methyl-phenyl | 1.20 |
| 10 | n-hexyl | 3-F-phenyl | 3-F-phenyl | 3-Cl-4-methyl-phenyl | 1.21 |
| 11 | n-hexyl | phenyl | 4-CCl$_3$-phenyl | 4-CCl$_3$-phenyl | 1.24 |
| 12 | n-hexyl | 3-SF$_5$-phenyl | phenyl | phenyl | 1.24 |
| 13 | n-hexyl | phenyl | 4-CF$_3$-phenyl | 4-CF$_3$-phenyl | 1.25 |
| 14 | n-hexyl | 2-F-phenyl | 2-F-phenyl | 2-F-phenyl | 1.26 |
| 15 | n-hexyl | phenyl | 3-OCF$_3$-phenyl | 3-OCF$_3$-phenyl | 1.26 |
| 16 | n-hexyl | 3-F-phenyl | 3-F-phenyl | 3-F-phenyl | 1.28 |

-continued

| Example | $R^{100}$ | $R^{101}$ | $R^{102}$ | $R^{103}$ | Eox (calculated) |
|---|---|---|---|---|---|
| 17 | n-hexyl | 4-methyl-2-chlorophenyl | 4-CF$_3$-phenyl | 4-CF$_3$-phenyl | 1.28 |
| 18 | n-hexyl | phenyl | 3-CF$_3$-phenyl | 3-CF$_3$-phenyl | 1.28 |
| 19 | n-hexyl | phenyl | 4-SO$_2$Me-phenyl | 4-SO$_2$Me-phenyl | 1.28 |
| 20 | n-hexyl | phenyl | 3-CN-phenyl | 3-CN-phenyl | 1.28 |
| 21 | n-hexyl | phenyl | 3-CCl$_3$-phenyl | 3-CCl$_3$-phenyl | 1.29 |
| 22 | n-hexyl | 3-Cl-phenyl | 3-F-phenyl | 3-F-phenyl | 1.29 |
| 23 | n-hexyl | phenyl | 3-SO$_2$Me-phenyl | 3-SO$_2$Me-phenyl | 1,29 |
| 24 | n-hexyl | 3-F-phenyl | 3-Br-phenyl | 3-Br-phenyl | 1,30 |
| 25 | n-hexyl | 3-CF$_3$-phenyl | phenyl | phenyl | 1.31 |
| 26 | n-hexyl | 3-CHF$_2$-phenyl | 3-CHF$_2$-phenyl | 3-CHF$_2$-phenyl | 1.31 |
| 27 | n-hexyl | 3-Cl-phenyl | 3-Cl-phenyl | 3-Cl-phenyl | 1.32 |

-continued

| Example | $R^{100}$ | $R^{101}$ | $R^{102}$ | $R^{103}$ | Eox (calculated) |
|---|---|---|---|---|---|
| 28 | n-butyl | 3-Cl-phenyl | 3-Cl-phenyl | 3-Cl-phenyl | 1.32 |
| 29 | n-hexyl | 3-Br-phenyl | 3-F-phenyl | 3-F-phenyl | 1.32 |
| 30 | n-hexyl | 3-Br-phenyl | 3-Cl-phenyl | 3-Cl-phenyl | 1.33 |
| 31 | n-hexyl | 3-Cl-phenyl | 3-Br-phenyl | 3-Br-phenyl | 1.33 |
| 32 | n-hexyl | 3-F-phenyl | 3-Cl-phenyl | 3-Cl-phenyl | 1.34 |
| 33 | n-hexyl | phenyl | 4-CN-phenyl | 4-CN-phenyl | 1.34 |
| 34 | n-hexyl | phenyl | 4-SCF$_3$-phenyl | 4-SCF$_3$-phenyl | 1.35 |
| 35 | n-hexyl | 4-CHF$_2$-phenyl | 4-CHF$_2$-phenyl | 4-CHF$_2$-phenyl | 1.35 |
| 36 | n-hexyl | 3-Br-phenyl | 3-Br-phenyl | 3-Br-phenyl | 1.36 |
| 37 | n-hexyl | 3-F-phenyl | 3-Br-phenyl | 3-Cl-phenyl | 1.36 |
| 38 | n-hexyl | 4-CO$_2$Me-phenyl | 4-CO$_2$Me-phenyl | 4-CO$_2$Me-phenyl | 1.36 |
| 39 | n-hexyl | 4-COMe-phenyl | 4-COMe-phenyl | 4-COMe-phenyl | 1.37 |

-continued

| Example | R¹⁰⁰ | R¹⁰¹ | R¹⁰² | R¹⁰³ | Eox (calculated) |
|---|---|---|---|---|---|
| NEB-1 | n-hexyl | 3-methyl-4-chlorophenyl | 3-methyl-4-chlorophenyl | 3-methyl-4-chlorophenyl | 1.15 |
| NEB-2 | n-do-decyl | 4-trifluoromethoxyphenyl | 4-trifluoromethoxyphenyl | 4-trifluoromethoxyphenyl | 1.38 |
| NEB-3 | n-hexyl | 4-trifluoromethylphenyl | 4-trifluoromethylphenyl | 4-trifluoromethylphenyl | 1.45 |

Based on formula (II), the radical designations $R^{100}$ from Table 1 correspond to the radical $A\text{-}R^{100}$ in formula (II), the radicals $R^{101}$, $R^{102}$ and $R^{103}$ on the aromatic from Table 1 each correspond to the radical or radicals $R^{101}$, $R^{102}$ and $R^{103}$ of formula (II), as specified in the following Table 1a.

TABLE 1a

Oxidation potentials of various triarylalkylborate anions calculated according to formula (III), where the specified radicals refer to formula (III) from claim 6 and the oxidation potential is specified in [V] in comparison to the saturated calomel electrode in the solvent acetonitrile.

| Ex. | A-R¹⁰⁰ | R¹⁰¹ | R¹⁰² | R¹⁰³ | $E_{ox}$ calc'ed) |
|---|---|---|---|---|---|
| 1 | A: methylene, R¹⁰⁰: n-pentyl = A-R¹⁰⁰: n-hexyl | para-position: methyl-, meta-position: Cl— | para-position: methyl-, meta-position: Cl— | para-position: F— | 1.16 |
| 2 | A: methylene, R¹⁰⁰: n-pentyl = A-R¹⁰⁰: n-hexyl | meta-position: 3'-cyanophenyl | meta-position: 3'-cyanophenyl | meta-position: 3'-cyanophenyl | 1.16 |
| 3 | A: methylene, R¹⁰⁰: n-pentyl = A-R¹⁰⁰: n-hexyl | hydrogen | hydrogen | meta-position: trichloromethyl | 1.16 |
| 4 | A: methylene, R¹⁰⁰: n-pentyl = A-R¹⁰⁰: n-hexyl | para-position: methyl | para-position: methyl | meta-position: trifluoromethyl | 1.17 |
| 5 | A: methylene, R¹⁰⁰: n-pentyl = A-R¹⁰⁰: n-hexyl | para-position: chloro | para-position: chloro | para-position: chloro | 1.17 |
| 6 | A: methylene, R¹⁰⁰: n-pentyl = A-R¹⁰⁰: n-hexyl | para-position: chloro- | para-position: chloro- | para-position: fluoro- | 1.18 |
| 7 | A: methylene, R¹⁰⁰: n-pentyl = A-R¹⁰⁰: n-hexyl | ortho-position: chloro- | ortho-position: chloro- | ortho-position: chloro- | 1.18 |
| 8 | A: methylene, R¹⁰⁰: n-pentyl = A-R¹⁰⁰: n-hexyl | meta-position: chloro para-position: methyl | meta-position: chloro para-position: methyl | meta-position: trifluoromethyl | 1.20 |

TABLE 1a-continued

Oxidation potentials of various triarylalkylborate anions calculated according to formula (III), where the specified radicals refer to formula (III) from claim 6 and the oxidation potential is specified in [V] in comparison to the saturated calomel electrode in the solvent acetonitrile.

| Ex. | A-$R^{100}$ | $R^{101}$ | $R^{102}$ | $R^{103}$ | $E_{ox}$ calc'ed) |
|---|---|---|---|---|---|
| 9 | A: methylene, $R^{100}$: n-pentyl = A-$R^{100}$: n-hexyl | meta-position: chloro | meta-position: chloro | meta-position: chloro para-position: methyl | 1.20 |
| 10 | A: methylene, $R^{100}$: n-pentyl = A-$R^{100}$: n-hexyl | meta-position: chloro para-position: methyl | meta-position: fluoro | meta-position: fluoro | 1.21 |
| 11 | A: methylene, $R^{100}$: n-pentyl = A-$R^{100}$: n-hexyl | hydrogen | para-position: trichloromethyl | para-position: trichloromethyl | 1.24 |
| 12 | A: methylene, $R^{100}$: n-pentyl = A-$R^{100}$: n-hexyl | meta-position: pentafluorosulfanyl | hydrogen | hydrogen | 1.24 |
| 13 | A: methylene, $R^{100}$: n-pentyl = A-$R^{100}$: n-hexyl | hydrogen | para-position: trifluoromethyl | para-position: trifluoromethyl | 1.25 |
| 14 | A: methylene, $R^{100}$: n-pentyl = A-$R^{100}$: n-hexyl | ortho-position: fluoro | ortho-position: fluoro | ortho-position: fluoro | 1.26 |
| 15 | A: methylene, $R^{100}$: n-pentyl = A-$R^{100}$: n-hexyl | hydrogen | meta-position: trifluoromethoxy | meta-position: trifluoromethoxy | 1.26 |
| 16 | A: methylene, $R^{100}$: n-pentyl = A-$R^{100}$: n-hexyl | meta-position: fluoro | meta-position: fluoro | meta-position: fluoro | 1.28 |
| 17 | A: methylene, $R^{100}$: n-pentyl = A-$R^{100}$: n-hexyl | meta-position: chloro para-position: methyl | para-position: trifluoromethyl | para-position: trifluoromethyl | 1.28 |
| 18 | A: methylene, $R^{100}$: n-pentyl = A-$R^{100}$: n-hexyl | hydrogen | meta-position: trifluoromethyl | meta-position: trifluoromethyl | 1.28 |
| 19 | A: methylene, $R^{100}$: n-pentyl = A-$R^{100}$: n-hexyl | hydrogen | para-position: methylsulfonyl | para-position: methylsulfonyl | 1.28 |
| 20 | A: methylene, $R^{100}$: n-pentyl = A-$R^{100}$: n-hexyl | hydrogen | meta-position: cyano | meta-position: cyano | 1.28 |
| 21 | A: methylene, $R^{100}$: n-pentyl = A-$R^{100}$: n-hexyl | hydrogen | meta-position: trichloromethyl | meta-position: trichloromethyl | 1.29 |
| 22 | A: methylene, $R^{100}$: n-pentyl = A-$R^{100}$: n-hexyl | meta-position: chloro | meta-position: fluoro | meta-position: fluoro | 1.29 |

TABLE 1a-continued

Oxidation potentials of various triarylalkylborate anions calculated according to formula (III), where the specified radicals refer to formula (III) from claim 6 and the oxidation potential is specified in [V] in comparison to the saturated calomel electrode in the solvent acetonitrile.

| Ex. | A-$R^{100}$ | $R^{101}$ | $R^{102}$ | $R^{103}$ | $E_{ox}$ calc'ed) |
|---|---|---|---|---|---|
| 23 | A: methylene, $R^{100}$: n-pentyl = A-$R^{100}$: n-hexyl | hydrogen | meta-position: methylsulfonyl | meta-position: methylsulfonyl | 1.29 |
| 24 | A: methylene, $R^{100}$: n-pentyl = A-$R^{100}$: n-hexyl | meta-position: fluoro | meta-position: bromo | meta-position: bromo | 1.30 |
| 25 | A: methylene, $R^{100}$: n-pentyl = A-$R^{100}$: n-hexyl | meta-position: trifluoromethyl | hydrogen | hydrogen | 1.31 |
| 26 | A: methylene, $R^{100}$: n-pentyl = A-$R^{100}$: n-hexyl | meta-position: difluoromethyl | meta-position: difluoromethyl | meta-position: difluoromethyl | 1.31 |
| 27 | A: methylene, $R^{100}$: n-pentyl = A-$R^{100}$: n-hexyl | meta-position: chloro | meta-position: chloro | meta-position: chloro | 1.32 |
| 28 | A: methylene, $R^{100}$: n-propyl = A-$R^{100}$: n-butyl | meta-position: chloro | meta-position: chloro | meta-position: chloro | 1.32 |
| 29 | A: methylene, $R^{100}$: n-pentyl = A-$R^{100}$: n-hexyl | meta-position: bromo | meta-position: fluoro | meta-position: fluoro | 1.32 |
| 30 | A: methylene, $R^{100}$: n-pentyl = A-$R^{100}$: n-hexyl | meta-position: bromo | meta-position: chloro | meta-position: chloro | 1.33 |
| 31 | A: methylene, $R^{100}$: n-pentyl = A-$R^{100}$: n-hexyl | meta-position: chloro | meta-position: bromo | meta-position: bromo | 1.33 |
| 32 | A: methylene, $R^{100}$: n-pentyl = A-$R^{100}$: n-hexyl | meta-position: fluoro | meta-position: chloro | meta-position: chloro | 1.34 |
| 33 | A: methylene, $R^{100}$: n-pentyl = A-$R^{100}$: n-hexyl | hydrogen | para-position: cyano | para-position: cyano | 1.34 |
| 34 | A: methylene, $R^{100}$: n-pentyl = A-$R^{100}$: n-hexyl | hydrogen | para-position: trifluoromethylthiol | para-position: trifluoromethylthiol | 1.35 |
| 35 | A: methylene, $R^{100}$: n-pentyl = A-$R^{100}$: n-hexyl | para-position: difluoromethyl | para-position: difluoromethyl | para-position: difluoromethyl | 1.35 |
| 36 | A: methylene, R 100: n-pentyl = A-R100: n-hexyl | meta-position: bromo | meta-position: bromo | meta-position: bromo | 1.36 |
| 37 | A: methylene, | meta-position: fluoro | meta-position: bromo | meta-position: chloro | 1.36 |

TABLE 1a-continued

Oxidation potentials of various triarylalkylborate anions calculated according to formula (III), where the specified radicals refer to formula (III) from claim 6 and the oxidation potential is specified in [V] in comparison to the saturated calomel electrode in the solvent acetonitrile.

| Ex. | A-R$^{100}$ | R$^{101}$ | R$^{102}$ | R$^{103}$ | E$_{ox}$ calc'ed |
|---|---|---|---|---|---|
| 38 | R$^{100}$: n-pentyl = A-R$^{100}$: n-hexyl A: methylene, | para-position: methyl ester | para-position: methyl ester | para-position: methyl ester | 1.36 |
| 39 | R$^{100}$: n-pentyl = A-R$^{100}$: n-hexyl A: methylene, | para-position: acetyl | para-position: acetyl | para-position: acetyl | 1.37 |
| NEB-1 | R$^{100}$: n-pentyl = A-R$^{100}$: n-hexyl A: methylene, | para-position: methyl meta-position: chloro | para-position: methyl meta-position: chloro | para-position: methyl meta-position: chloro | 1.15 |
| NEB-2 | R$^{100}$: n-pentyl = A-R$^{100}$: n-hexyl A: methylene, | para-position: trifluoromethoxy | para-position: trifluoromethoxy | para-position: trifluoromethoxy | 1.38 |
| NEB-3 | R$^{100}$: n-undecyl = A-R$^{100}$: n-dodecyl A: methylene, R$^{100}$: n-pentyl = A-R$^{100}$: n-hexyl | para-position: trifluoromethyl | para-position: trifluoromethyl | para-position: trifluoromethyl | 1.45 |

Evaluation of the Thermal Stability of the Photopolymer Films with Coinitiators According to the invention:

The requirements for the photopolymer films produced here are both a low performance loss of the photoactivity after a temperature conditioning step and a complete bleachability of the photopolymer film after holographic exposure has been carried out. This was tested as follows:

First, two samples were prepared in the same way for each example. The preparation comprises first the removal of the laminating film of the photopolymer layer structure and subsequently the lamination of the resulting unprotected side of the photopolymer onto a glass sheet, so that each time a glass-photopolymer-substrate film layer structure is present. From one of these samples, later referred to as room temperature sample (RT), a transmission spectrum ($T_{1,RT}$) was recorded directly without temperature conditioning. The second sample, later referred to as temperature conditioning sample (Temp), was temperature-conditioned in a drying oven for 30 min at 140° C. After the temperature conditioning step, a transmission spectrum ($T_{1,Temp}$) was also recorded from the sample. Consequently, a test hologram was written into the photopolymer layer of both samples with a 633 nm laser using a two-beam interference laser set-up as shown in FIG. 1 and described above. The quality of this hologram was assessed by the refractive index modulation Δn of the sample, derived from the diffraction efficiency read out and the angle selectivity thereof. Subsequently, both samples were bleached over the full area for 30 min under UV light radiation. A transmission spectrum ($T_{2,RT}$ and $T_{2,Temp}$) of the two bleached samples was likewise recorded again. The thermal stability with simultaneously high bleachability of a photopolymer was assessed on the basis of three criteria, all three of which absolutely must be fulfilled at the same time. The three fulfillment criteria are described in detail subsequently:

1. Thermal stability evaluated according to transmission loss TS(T): The ratio of the transmission at the absorption maximum of the dye used (here 655 nm) after the temperature conditioning step of the Temp sample, $T_{1,Temp,655}$, to the transmission of the RT sample at the same wavelength, $T_{1,RT,655}$, must be greater than 50%. The transmission values here must be corrected for the background absorption caused by turbidity or the like (the transmission at 730 nm is used here as reference value) ($T_{2,Temp,730}$):

$$TS(T) = \frac{T_{1,Temp,655} - T_{2,Temp,730}}{T_{1,RT,655} - T_{2,Temp,730}} > 45\% \qquad (21)$$

2. Thermal stability evaluated according to Δn: TS(Δn): The refractive index difference Δn of the Temp sample must be greater than 0.007:

$$TS(\Delta n) = \Delta n_{Temp} > 0.007 \qquad (22)$$

3. Bleachability evaluated according to residual absorption B(T): the ratio of the transmission after bleaching of the Temp sample with UV light ($T_{2,Temp,510}$) to the original transmission of the RT sample ($T_{1,RT,510}$) must be ≤15%. Again, the transmission values must be corrected for the background absorption caused by turbidity or the like ($T_{2,Temp,730}$):

$$B(T) = \frac{T_{2,Temp,655} - T_{2,Temp,730}}{T_{1,RT,655} - T_{2,Temp,730}} \leq 5\% \qquad (23)$$

The following transmission and Δn values of some examples according to the invention and not according to the invention were determined:

TABLE 2

Measured transmission and Δn values of the examples according to the invention and not according to the invention, and the evaluations calculated therefrom. $T_{1,RT,655}$: Transmission of RT sample at 655 nm; $T_{1,Temp,655}$: Transmission of Temp sample at 655 nm; $T_{2,Temp,730}$: Background transmission determined at 730 nm; TS(T): Evaluation of thermal stability according to transmission loss; TS(Δn): Evaluation of thermal stability according to Δn; B(T): Assessment of bleachability after residual transmission.

| Ex. | $E_{ox}$ (V)* | $T_{1,RT,655}$ (%) | $T_{1,Temp,655}$ (%) | $T_{2,Temp,655}$ (%) | $T_{2,Temp,730}$ (%) | TS(T) (%) | TS (Δn) | B(T) (%) |
|---|---|---|---|---|---|---|---|---|
| 22 | 1.29 | 22 | 53 | 90 | 92 | 56 | 0.013 | 2 |
| 27a | 1.32 | 20 | 55 | 91 | 92 | 51 | 0.014 | 1 |
| 27b | 1.32 | 25 | 55 | 91 | 92 | 54 | 0.007 | 1 |
| 27c | 1.32 | 18 | 57 | 90 | 92 | 48 | 0.010 | 2 |
| 27d | 1.32 | 19 | 42 | 89 | 91 | 68 | 0.019 | 3 |
| 27e | 1.32 | 18 | 35 | 89 | 91 | 77 | 0.018 | 2 |
| 32 | 1.34 | 15 | 29 | 90 | 92 | 81 | 0.017 | 2 |
| NEB1 | 1.15 | 19 | 89 | 91 | 92 | 3 | 0 | 1 |
| NEB2 | 1.45 | 18 | 20 | 85 | 91 | 97 | 0.016 | 8 |

*vs. SCE in acetonitrile; calculated; based on the triarylalkylborate used.

The results obtained show that the required properties-thermal stability and bleachability-of a photopolymer are achieved with the triarylalkylborate salts according to the invention. A photopolymer can therefore only be assumed to be sufficiently thermally stable and bleachable if the calculated oxidation potential of the borate salt used is greater than 1.15 V and less than 1.38 V vs. SCE in acetonitrile. The use of all borates listed in table 1 as coinitiators in photopolymers therefore leads to thermally stable and bleachable photopolymers. The thermal stability and bleachability of the photopolymer do not depend on the cation of the borate salt used, as a comparison of examples 27a to 27e shows.

The examples NEB1 and NEB2 not according to the invention fail in at least one required property and are thus unsuitable for providing the required properties.

The invention claimed is:

1. A photopolymer composition comprising a) matrix polymers, b) writing monomers, c) at least one photoinitiator system, d) optionally, at least one non-photopolymerizable component, e) optionally, catalysts, radical stabilizers, solvents, additives and other auxiliaries and/or adjuvants, wherein the at least one photoinitiator system c) consists of at least one dye and at least one coinitiator, where at least one of the dyes has a structure according to formula (I)

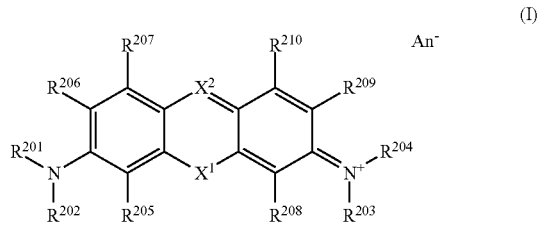

in which $X^1$ stands for O, S, N—$R^{211}$ or $CR^{211a}R^{211b}$, $R^{211}$ stands for hydrogen, $C_1$ to $C_{16}$ alkyl, $C_4$ to $C_7$ cycloalkyl, $C_7$ to $C_{16}$ aralkyl, $C_6$ to $C_{10}$ aryl or a heterocyclic radical, $R^{211a}$ and $R^{211b}$ are identical and stand for methyl, ethyl or together stand for a —$CH_2$—$CH_2$—$CH_2$— or —$CH_2$—$CH_2$—$CH_2$—$CH_2$— bridge, $X^2$ stands for N or C—$R^{212}$, $R^{212}$ stands for hydrogen, cyano, $C_1$ to $C_4$ alkyl, $C_4$ to $C_7$ cycloalkyl, a $C_6$ to $C_{10}$ aryl which is optionally substituted by $C_1$ to $C_4$ alkoxycarbonyl or $NR^{213}R^{214}$, or a heterocyclic radical, $R^{201}$ to $R^{204}$, $R^{213}$ and $R^{214}$ stand independently of each other for hydrogen, $C_1$ to $C_{16}$ alkyl, $C_4$ to $C_7$ cycloalkyl, $C_7$ to $C_{16}$ aralkyl, $C_6$ to $C_{10}$ aryl or a heterocyclic radical or $NR^{201}R^{202}$, $NR^{203}R^{204}$ and $NR^{213}R^{214}$ stand independently of each other for a five- or six-membered saturated ring attached via N, which may additionally contain an N or O and/or may be substituted by nonionic radicals, or $R^{201}$ to $R^{204}$, $R^{213}$ and $R^{214}$ independently of each other and with a C atom of the benzene ring adjacent to the N atom form a two- or three-membered bridge, which may contain an O or N and/or may be substituted by nonionic radicals, $R^{205}$, $R^{206}$, $R^{207}$, $R^{208}$, $R^{209}$ and $R^{210}$ stand independently of each other for hydrogen, halogen or $C_1$ to $C_4$ alkyl, An⁻ stands for an anion selected from halide, perchlorate, tetrafluoroborate, hexafluorophosphate, hexafluoroantimonate, tetraarylborate, triarylalkylborate, nitrate, cyanide, tosylate, trifluoromethylsulfonate, bis(trifluoromethyl)sulfonimide, azide, methylsulfonate, phosphate, hydrogen phosphate, dihydrogen phosphate, sulfate, hydrogensulfate, an arbitrarily substituted carboxylate, an arbitrarily substituted organic mono- or di-sulfonate, or an arbitrarily substituted organic mono- or di-carboxylate, and the at least one coinitiator has a calculated oxidation potential $E_{ox}^{calculated}$, determined according to the formula (1) below by the quantum mechanical calculation of the Gibbs energies at 298 K of the ground state and the oxidized state of the coinitiator consisting of conformer energy minimization by means of the AM1 force field followed by ab initio conformer energy calculation based on the previously determined molecular geometry coordinates, in the solvent acetonitrile under solvent field correction according to the PCM method, in the range from 1.16 V to 1.37 V against the saturated calomel electrode (SCE) in acetonitrile $$E_{ox}^{calculated} = -\frac{(G_{298} - G_{298}(\text{oxidized}))}{23.061 \frac{\text{kcal}}{\text{mol} \cdot \text{V}}} + 4.14 \text{ V}. \quad (1)$$

2. The photopolymer composition as claimed in claim 1, wherein the at least one dye according to the structure of formula (I) has the following radicals:

$X^1$ stands for O, S or $NR^{211}$, $X^2$ stands for N, $R^{211}$ stands for hydrogen, methyl, ethyl, propyl, butyl, cyclohexyl, benzyl, phenyl, tolyl, anisyl or chlorophenyl, $R^{201}$ to $R^{204}$ stand independently of each other for hydrogen, methyl, ethyl, propyl, butyl, chloroethyl, cyanomethyl, cyanoethyl, methoxyethyl, cyclopentyl, cyclohexyl, cyclohexylmethyl, benzyl, phenyl, tolyl, anisyl or chlorophenyl or $NR^{201}R^{202}$, $NR^{203}R^{204}$ and $NR^{213}R^{214}$ stand independently of each other for pyrrolidino, piperidino, morpholino or N-methylpiperazino, $R^{205}$, $R^{206}$, $R^{207}$, $R^{208}$, $R^{209}$ and $R^{210}$ stand for hydrogen or in each case one of the radicals $R^{205}$, $R^{206}$, $R^{207}$ and/or one of the radicals $R^{208}$, $R^{209}$ and $R^{210}$ stands for methyl or $R^{201}$; $R^{205}$, $R^{202}$; $R^{206}$, $R^{203}$; $R^{208}$ and $R^{204}$; $R^{209}$ independently of each other form a —$CH_2CH_2$—, —$CH_2CH_2CH_2$— or —$CH_2CH_2$—O— bridge, which can carry up to three methyl groups.

3. The photopolymer composition as claimed in claim 1, wherein the at least one dye has a structure of formula (XVII),

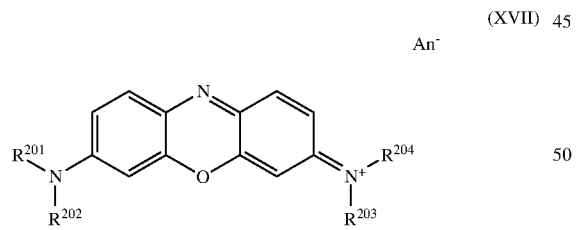

(XVII)
An⁻ in which $R^{201}$ to $R^{204}$ stand independently of each other for hydrogen, methyl, ethyl, propyl or butyl.

4. The photopolymer composition as claimed in claim 1, wherein the at least one dye according to formula (I) or formula (XVII) present has an organically substituted sulfonate as anion (An⁻).

5. The photopolymer composition as claimed in claim 1, wherein the at least one coinitiator is a triarylalkylborate salt.

6. The photopolymer composition as claimed in claim 1, wherein the at least one coinitiator contains a triarylalkylborate of formula (II),

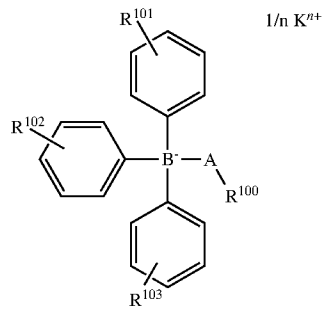

(II)

in which

A stands for a methylene group or for an arbitrarily substituted methine group, which optionally forms an up to 10-membered ring with $R^{100}$, $R^{100}$ is a $C_1$ to $C_{20}$ alkyl, $C_3$ to $C_{20}$ alkenyl, $C_3$ to $C_{20}$ alkynyl, $C_5$ to $C_7$ cycloalkyl or $C_7$ to $C_{13}$ aralkyl radical, optionally substituted by hydroxyl and/or alkoxy and/or acyloxy and/or halogen, $R^{101}$, $R^{102}$ and $R^{103}$ each stand independently of each other for up to five independently selected radicals from $C_1$ to $C_{10}$ alkyl, $C_3$ to $C_5$ alkenyl, $C_3$ to $C_8$ alkynyl, $C_5$ to $C_7$ cycloalkyl or $C_7$ to $C_{13}$ aralkyl radical, halogen, cyano, trifluoromethyl, trichloromethyl, difluoromethyl, dichloromethyl, trifluoromethylthioyl, trichloromethylthioyl, $C_1$ to $C_4$ alkoxy, trifluoromethoxy, trichloromethoxy, $C_1$ to $C_4$ alkylthioyl, thioyl, difluoromethoxy, difluoromethylthioyl, carboxyl, carbonyl, 2-, 3- or 4-pyridyl, or any substituted aryl radicals or hydrogen, $K^+$ stands for an arbitrarily substituted organocation of valence n based on nitrogen, phosphorus, oxygen, sulfur, and/or iodine and n stands for 1, 2, or 3.

7. The photopolymer composition as claimed in claim 6, wherein the at least one coinitiator of the formula (II) has the following radicals:

$R^{100}$ stands for a $C_1$ to $C_{20}$ alkyl, $C_3$ to $C_{12}$ alkyl radical, $C_5$ to $C_7$ cycloalkyl or $C_7$ to $C_{13}$ aralkyl radical and $R^{101}$, $R^{102}$, and $R^{103}$ each stand independently of each other for one to two radicals selected from the group consisting of $C_1$ to $C_4$ alkyl, halogen, cyano, trifluoromethyl, $C_1$ to $C_4$ alkoxy or arbitrarily substituted aryl radicals and hydrogen.

8. The photopolymer composition as claimed in claim 6, wherein $R^{100}$ stands for a $C_3$ to $C_{12}$ alkyl radical and $R^{101}$, $R^{102}$, and $R^{103}$ stand independently of each other for one to two radicals in meta or para position, selected from the group consisting of $C_1$ to $C_4$ alkyl radicals and halogen substituents.

9. The photopolymer composition as claimed in claim 1, wherein the organocation $K^+$ of the triarylalkylborate salt is a nitrogen- or phosphorus-based, mono- or divalent cation.

10. The photopolymer composition as claimed in claim 1, wherein the at least one coinitiator has an oxidation potential in a range between 1.20 V vs. SCE and 1.36 V vs. SCE in acetonitrile.

11. A layer structure containing at least the following layers:
- A. a substrate layer A;
- B. a photopolymer layer B, formed from the photopolymer composition as claimed in claim 1, and C. a top layer C.

12. A layer structure containing at least the following layers:
- A. a substrate layer A,
- B'. a cured photopolymer layer B', produced from the photopolymer composition as claimed in claim 1 by curing by means of light, and
- C. a top layer C.

13. A holographic medium containing a photopolymer composition as claimed in claim 1.

14. The holographic medium as claimed in claim 13, which has been converted to a hologram by means of exposure, wherein the hologram is selected from the group consisting of a reflection, transmission, in-line, off-axis, full-aperture transfer, white-light transmission, Denisyuk, off-axis reflection or edge-lit hologram and a holographic stereogram, it being likewise possible for combinations of these hologram types or plurality of holograms of the same type independently of each other to be united in the same volume of the holographic medium (multiplexing).

15. An optical display comprising a holographic medium as claimed in claim 13.

16. A method for producing chip cards, identity documents, 3D images, product protection tags, labels, banknotes or holographically optical elements.

17. A method for producing a holographic medium comprising providing the photopolymer composition as claimed in claim 1.

* * * * *